US010463065B2

(12) United States Patent
Rao et al.

(10) Patent No.: US 10,463,065 B2
(45) Date of Patent: Nov. 5, 2019

(54) **ENZYME-ASSISTED EXTRACTION OF STEVIOL GLYCOSIDES FROM THE LEAVES OF *STEVIA REBAUDIANA* BERTONI**

(71) Applicant: Council of Scientific and Industrial Research, New Delhi (IN)

(72) Inventors: Adari Bhaskar Rao, Telangana (IN); Meshram Harshdas Mitaram, Telangana (IN); George Sara Anisa, Telangana (IN); Alavala Sateesh, Telangana (IN); YVL Ravi Kumar, Telangana (IN); Madupathi Madhumala, Telangana (IN); Nandala Shiva Prasad, Telangana (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 50 days.

(21) Appl. No.: 15/366,120

(22) Filed: Dec. 1, 2016

(65) Prior Publication Data

US 2018/0153196 A1 Jun. 7, 2018

(51) Int. Cl.
*A61K 36/00* (2006.01)
*A23L 5/30* (2016.01)
(Continued)

(52) U.S. Cl.
CPC ............... *A23L 5/30* (2016.08); *A23L 5/23* (2016.08); *A23L 5/25* (2016.08); *A23L 27/36* (2016.08); *A23V 2002/00* (2013.01)

(58) Field of Classification Search
CPC .......... A23V 2250/262; A23V 2250/21; A23V 2250/258; C07H 1/08; C07H 71/06; C07H 15/24; A61K 36/00; A61K 35/78
See application file for complete search history.

(56) References Cited

U.S. PATENT DOCUMENTS 4,361,697 A 11/1982 Dobberstein
4,599,403 A 7/1986 Kumar
(Continued)

FOREIGN PATENT DOCUMENTS

BR PI8402752 1/1986
CN 200810216065 2/2009
(Continued)

OTHER PUBLICATIONS

Anton, SD et al., Appetite 55(1): 37-43 (2010).
(Continued)

*Primary Examiner* — Hong T Yoo
(74) *Attorney, Agent, or Firm* — Alston & Bird LLP

(57) ABSTRACT

The invention relates to the development of a simple and eco-friendly process of extraction of sweet glycosides: steviosides from the leaves of *Stevia rebaudiana*. In particular, certain embodiments provide enhanced isolation of steviosides by enzyme assisted extraction, in combination with metal salts, followed by pressurized aqueous extraction. Thus obtained *stevia* extract was further processed for clarification and purification using multi-stage membrane filters (micro-filtration, ultra-filtration and nano membrane filtration) to obtain high purity steviosides from the *Stevia* leaves. This improved process confirms the isolation of high purity steviol glycosides i.e., Stevioside and Rebaudioside-A as the final products, with improved organoleptic properties. Thus, this superior process helps in obtaining pure steviosides from the *Stevia* leaf extract, without impurities and obnoxious residues, using easy operational technology without any damage to the environment.

8 Claims, 22 Drawing Sheets

Schematic diagram for the production of Stevia sugar

(51) Int. Cl.
*A23L 5/20* (2016.01)
*A23L 27/30* (2016.01)

(56) References Cited

U.S. PATENT DOCUMENTS

| | | | |
|---|---|---|---|
| 4,892,938 | A | 1/1990 | Giovanetto |
| 5,238,098 | A | 8/1993 | Ishikawa-Ken |
| 5,972,120 | A | 10/1999 | Kutowy |
| 7,838,044 | B2 * | 11/2010 | Abelyan ............ A61K 36/28 424/725 |
| 2006/0134292 | A1 | 6/2006 | Abelyan |
| 2006/0142555 | A1 | 6/2006 | Kotesh |

FOREIGN PATENT DOCUMENTS

| | | |
|---|---|---|
| EP | 2526195 | 11/2012 |
| IN | 1280/MUM/208 | 12/2009 |
| JP | S 51-131900 | 11/1976 |
| JP | 54012400 | 1/1979 |
| JP | H067108 A | 1/1994 |

OTHER PUBLICATIONS

Chatsudthipong, V et al., Pharmacol Ther. 121(1):41-54 (2009).
Chemat, F et al., Int J. Mol Sci. 13(7):8615-8627 (2012).
Clos, JF et al., J. Agric. Food Chem. 56:8507-8513 (2008).
Das, A et al., Sep. Purif. Technol. 144 (C):8-15 (2015).
De Oliviera, BH et al. J. Biotech. 131(1):92-96 (2007).
Erkucuk, A. et al., J. Supercrit. Fluids. 51(1):29-35 (2009).
Esmat Abou-Arab, A et al., Afr. J. Food Sci. 4(5):269-281 (2010).
Fuh, WS et al., J. Food Sci. 55(5):1454-1457 (1990).
Gardana, CM et al., J. Chromatogr. A. 1217(9):1463-1470 (2010).
Geeraert, B et al., Int J Obes. 34(3):569-577 (2010).
Geuns, JMC Phytochemistry 64(5):913-921 (2003).
Gregersen, S. Metabolism 53(1):73-76 (2004).
Huang, XY et al., Sep. Purif. Technol. 71: 220-224 (2010).
Jaitak, V et al., Phytochem. Anal. 20(3):240-245 (2009).
Jentzer, JB et al., Food Chem. 166:561-567 (2015).
Kennelly, EJ. Sweet and non-sweet constituents of *Stevia rebaudiana* (Bertoni). In: Stevia, the genus *Stevia*. Medicinal and Aromatic plants—Industrial profiles. Kinghom AD (ed), Taylor and Francis, London and NY. 1:68-85 (2002).
Kirk, DE et al., J Food Sci. 48:1663-1666 (1983).
Kohda, H et al., Phytochem. 15:981-983 (1976).
Kostylev, M et al., Biofuels 3:61-70 (2012).
Kovylyaeva et al., *S.rebaudiana*, Chem. Nat. Compd. 43(1):81-85 (2007).
Li, J. Bioresour. Tech. 155:258-265 (2014).
Liu, CG. Carbohydr. Res. 341:2550-2556 (2006).
Liu, J et al., J. Chromatogr. Sci. 35(9):446-450 (1997).
Liu, L et al., Bioresour. Technol. 100:5853-5858 (2009).
Lobov, SV et al., Agric. Biol. Chem. 55:2959-2965 (1991).
Madan, S et al., Indian J. Nat. prod. Resor. 1(3):267-286 (2010).
Moraes, EP et al., Acta Scientiar. 23:1375-1380 (2001).
Mustafa, A. et al., Anal. Chim. Acta. 703(1):8-18 (2011).
Phillips, KC. Stevia: steps in developing a new sweetener In: Developments in Sweeteners-3, Elsevier Applied Science, London (ed: T.H. Grenby). 1-43 (1989).
Puri, M et al., Biotech. Adv. 29(6):781-791 (2011).
Puri, M. et al., Food Chem. 132:1113-1120 (2012).
Puri, M et al., Trends Biotechnol. 30: 37-44 (2012).
Rajasekaran, T et al., Food Biotech. 22(2):179-188 (2008).
Rajasekaran, T et al., J. Sci. Food Agric. 87:420-424 (2007).
Rao, AB et al.; Adv Biosci. Biotechnol. 3:327-335 (2012).
Rao AB. Int. J. Food Sci. Tech. 47(12):2554-2560 (2012).
Ruiz-Terán, F et al., J. Agric. Food Chem. 49(11):5207-5209 (2001).
Sowbhagya, HB et al.; Crit. Rev. Food. Sci. Nutr. 50:146-161 (2010).
Tanaka, O, Trends Anal. Chem. 1:246-248 (1982).
Wallin, H, 63$^{rd}$ JECFA (FAO) 1-5 (2004).
Wolwer-Rieck, U et al., J. Agric. Food Chem. 58:12216-12220 (2010).
Wood, HB et al., J. Org. Chem. 20(7):875-883 (1955).
Yaqin, X et al., Nature and Science 3(2):43-46. (2005).
Zhang, SQ et al. Food Research International. 33(7):617-620 (2000).
Chemat, F. et al., *Green Extraction of Natural Products: Theory and Practice*. Wiley-VCH, Verlag GmbH & Co.KGaA (2015) 190 pages.
Mondal, S. et al., *Stevioside: Technology, Applications and Health*. Wiley and Sons, Copyright. (2013) 123 pages.
Sarker, S.D. et al., *Methods in Biotechnology: Natural Products Isolation*, Humana Press, New Jersey, USA, (2006) 290 pages.

* cited by examiner

Fig. 1: Schematic diagram for the production of Stevia sugar

Fig. 7: Photograph of MF samples (a) Feed, (b) Permeate and (c) Concentrate

Fig. 8: Variation of flux and % steviosides recovery for UF-DF integrated membrane process Fig. 10: Final stevia product of 95-98% purity using an overall MF-UF-NF integrated membrane process configuration

ENZYME-ASSISTED EXTRACTION OF STEVIOL GLYCOSIDES FROM THE LEAVES OF *STEVIA REBAUDIANA* BERTONI

TECHNICAL FIELD

The present invention relates to an improved enzymatic extraction process of isolation of highly purified steviolglycosides from the leaf extracts of *Stevia rebaudiana* in an inexpensive and eco-friendly manner.

The study highlights a simplified process of isolation of steviosides involving the use of enzyme-assisted extraction followed by pressurized aqueous extraction. The pretreated *stevia* extract from the *Stevia* leaves was further processed for clarification and purification by micro membrane filtration (MF), ultra membrane filtration (UF) and nano membrane filtration (NF), to obtain steviosides of a high purity of 95-98%, with a yield of 90-95%. This improved process enables the isolation of high purity steviol glycosides i.e., Stevioside and Rebaudioside-A as final products, with improved organoleptic properties.

BACKGROUND

The food industry has traditionally used sugar (sucrose) as a sweetening agent. There are many synthetic and natural sources of sweeteners available in the market. The most common high intensity synthetic sweeteners in the world market are acesulfame-K, aspartame, neotame, saccharin and sucralose. The natural sweeteners available commercially include thaumatin, glycyrrhizin, xylitol, mogroside etc.

The increased consumption of high calorie sugars has resulted in several nutritional and medical problems, such as obesity, diabetes and cardiovascular diseases. Anton, S D et al., Appetite 55(1): 37-43 (2010). Dietary and health demands are continuing to expand the market for sweeteners as alternatives to sucrose. Therefore, there is a continuing search for non-nutritive, low-calorific, non-toxic and high intensity sweeteners, which can be used as sucrose alternatives.

Plants are gaining importance as major sources of high potency sweeteners in the growing natural food market. The plant *Stevia rebaudiana* Bertoni (family Asteraceae) commonly known as "a sweet herb" has been widely cultivated and is known as "a sweetener of the future." (a) Wood, H B et al., J. Org. Chem. 20(7):875-883 (1955); (b) Tanaka, O, Trends Anal. Chem. 1:246-248 (1982); (c) Geuns, JMC Phytochemistry 64(5):913-921 (2003); (d) Wallin, H, 63$^{rd}$ JECFA (FAO) 1-5 (2004); (e) Esmat Abou-Arab, A et al., Afr. J. Food Sci. 4(5):269-281 (2010); (f) Madan, S et al., Indian J. Nat. Prod. Resor. 1(3):267-286 (2010). The leaves of *Stevia rebaudiana* accumulate sweet-tasting steviosides, as the main diterpene glycosides with the common backbone of steviol. These terpenoids differ in the number of carbohydrate residues at $C_{13}$ and $C_{19}$ positions of the steviol skeleton. These steviol glycosides are 250-300 times sweeter than cane sugar with excellent compatibility with tea, coffee and other hot as well as cold beverages. (a) Clos, J F et al., J. Agric. Food Chem. 56:8507-8513 (2008). These sweet diterpene glycosides are non-caloric, non-nutritive, non-toxic and non-mutagenic in nature.

Among the nine steviol glycosides, Stevioside and Rebaudioside-A are the major constituents of the native plant *S. rebaudiana*. Kovylyaeva et al. Chem. Nat. Compd. 43(1): 81-85 (2007). When eaten regularly they decrease the content of blood sugar and cholesterol in the body, stimulate cell regeneration and strengthen blood vessels, thus these sweeteners are industrially/commercially important. (a) Chatsudthipong, V et al., Pharmacol Ther. 121(1):41-54 (2009); (b) Geeraert, B et al., Int J Obes. 34(3):569-577 (2010). The steviosides are the most exhaustively utilized diterpene glycosides that are used as sweeteners in both the food and the beverage industries. Apart from sweetening, steviosides also exert cardio-tonic and anti-oxidant effects, which is an absolute necessity in endurance sports. In addition, steviosides also exhibit promising therapeutic value as choleretic, anti-inflammatory, anticancer, diuretic agents and also prevent ulcers in the gastrointestinal tract. (a) Kennelly, E J. Sweet and non-sweet constituents of *Stevia rebaudiana* (*Bertoni*). In: *Stevia*, the genus *Stevia*. Medicinal and Aromatic plants -Industrial profiles. Kinghom A D (ed), Taylor and Francis, London and NY. 1:68-85 (2002); (b) Gregersen, S. Metabolism 53(1):73-76 (2004); (c) Wolwer-Rieck, U et al., J. Agric. Food Chem. 58:12216-12220 (2010); (d) Stevioside: Technology, Applications and Health. De, S; Mondal, S; Banerjee, S. Wiley and Sons, Copyright.(2013).

Despite wide therapeutic application of steviosides, their uses are restricted for human consumption due to their bitter after-taste and astringency. The grassy taste associated with the presence of some alkaloid/diterpene impurities, limits their application in the food and the pharmaceutical industries.

The sweetening potency and edulcorant properties of the different steviol glycosides present in the leaves of the *Stevia* plant differ from one another, thus the quality of the commercial product depends on the proportion of the steviol glycosides in the mixture. Among the important factors in producing a pleasant taste are the percentage/ratio of Stevioside and Rebaudioside-A present in the total extract of steviol glycosides. Attempts are made to improve the sweetness of steviosides by adding at least one natural sweetener like sucrose, glucose and fructose to them by glycosidation or by membrane separation of impurities to obtain high purity steviosides. (a) Kirk, D E et al., J Food Sci. 48:1663-1666 (1983); (b) Fuh, W S et al., J. Food Sci. 55(5):1454-1457 (1990); (c) Zhang, S Q et al. Food Research International. 33(7):617-620 (2000); (d) Rajasekaran, T et al., Food Biotech. 22(2):179-188 (2002); (e) Rajasekaran, T et al., J. Sci. Food Agric. 87:420-424 (2007); (f) Esmat Abou-Arab, A et al., Afr. J. Food Sci. 4(5): 269-281 (2010).

There has been a remarkable resurgence of interest in natural product research over the last decade or so, starting from extraction to determination of the structures of purified natural products, and their biological activity. (a) Sarker, S D; Latif, Z; Gray, A I. Methods in Biotechnology: Natural Product Isolation, Humana Press, New Jersey, USA, (2006); (b) Chemat, F; Strube, J. Green Extraction of Natural Products: Theory and Practice. Wiley-VCH, Verlag GmbH & Co.KGaA (2015). Prior to any isolation and purification work, natural products have to be extracted/released from the biomass. The choice of extraction procedure depends on the nature of the source material and the compounds to be isolated. The design of green and sustainable extraction methods of natural products is currently a hot research topic in the multidisciplinary area of Applied Chemistry and Food Technology. Bioactive compounds in plants are typically present at low concentrations. 'Classic' solvent-based extraction of phytochemicals procedures (e.g. maceration, percolation, Soxhlet extraction, extraction under reflux, steam distillation and super critical carbon dioxide extraction) are still applied widely in photochemistry despite the fact that these methodologies lack reproducibility and are both time and solvent consuming. (a) Liu, J et al., J.

Chromatogr. Sci. 35(9):446-450 (1997); (b) Jaitak, V et al., Phytochem. Anal. 20(3):240-245 (2009); (c) Erkucuk, A. et al., J. Supercrit. Fluids. 51(1):29-35 (2009); (d) Mustafa, A. et al., Anal. Chim. Acta. 703(1):8-18 (2011); (e) Jentzer, J B et al., Food Chem. 166:561-567 (2015). Solvent based extraction of bioactives often suffers from low extraction yields, requires long extraction times and decreased product quality.

Recently, enzyme-assisted extraction methods have been reported for the extraction of plant-based bioactives. (a) Ruiz-Terán, F et al., J. Agric. Food Chem. 49(11):5207-5209 (2001); (b) Sowbhagya, H B et al.; Crit. Rev. Food. Sci. Nutr. 50:146-161 (2010); (c) Puri, M. et al., Food Chem. 132:1113-1120 (2012). Enzyme-based extraction of bioactive compounds from plants is a potential alternative to well known conventional solvent based extraction methodologies. This improved green and eco-friendly extraction process increases the effective solvent pre-treatment, reduces the amount of solvent needed for extraction and increases the yield of extractable compounds. (a) Chemat, F et al., Int J. Mol Sci. 13(7):8615-8627 (2012); (b) Li, J et al., Bioresour. Technol. 155:258-265 (2014). Food-grade hydrolases such as lipases, proteases, cellulases, hemicellulases, pectinases and thermolysin are widely used in processing and clarification, and improve the extractability of the desired compounds.

In recent years there has been an increasing demand for natural, non-nutritive, high intensity sweeteners with low-calorie value, as a sugar substitute. Extracts of the leaves of *Stevia rebaudiana* have been known for their sweet taste. Stevioside and Rebaudioside-A are the two major diterpenoid glucosides components present in the leaf extracts of *Stevia*. These glycosides are 300 times sweeter than sugar and also exhibit wide therapeutic activity. The potential widespread use of the steviosides requires an easy and effective extraction methodology. There has been abundant published/patented literature on the extraction and isolation of steviosides from dried *stevia* leaves. The conventional methods of isolation and purification processes of steviosides involves aqueous, supercritical fluid, microwave and metallic ion extraction methodologies, and the purification processes of steviosides involves long extraction and purification procedures by using different chromatographic techniques like resins and zeolites, membrane separation and electrophoresis methodologies. All these available procedures of extraction processes are having the draw backs like low yields, use of expensive resins and metal ions, some of these processes release noxious residues that are harmful for health and are not eco-friendly. Thus the process developed in isolation of steviosides are expensive and are not eco-friendly; therefore a simple procedures for the isolation of good quality, high yields, with improved organoleptic properties of steviosides is a present day challenging problem. (a) Haga, T; Ise, R; Kobayashi, T. Japanese patent 51-131900 (1976); (b) Kohda, H et al., Phytochem. 15:981-983 (1976); (c) Ishizone, H. Japan Kokai Pat 79,12,400 (1979); (d) Dobberstein, R H; Ahmed, M S. U.S. Pat. No. 4,361,697 (1982); (e) Alvarez, M; Couto, ACC. Brasil Pat. 84,02,752 (1984); (f) Kumar, S. U.S. Pat. No. 4,599,403 (1986); (g) Giovanetto, R H. U.S. Pat. No. 4,892,938 (1990); (h) Lobov, S V et al., Agric. Biol. Chem. 55:2959-2965 (1991); (i) Tan, S; Ueki, H. Jap. Pat. 06-007108 (1994); (j) Moraes, E P et al., Acta Scientiar. 23(6):1375-1380 (2001); (k) Kotesh, K J; Babu, G D K et al. US Patent 2006/0142555A1 (June 2006) 11/022277/US; dated: Dec. 23, 2004; (l) De Oliviera, B H et al. J. Biotech. 131(1):92-96 (2007); (m) Abelyan, V H; Ghochikyan, Y T et al. US Pat. 7838044B2, U.S. Ser. No. 11/016,781 (2010); (n) Puri, M et al., Biotech. Adv. 29(6): 781-791 (2011); (o) Wehrli, C. EP 2526195 A1 (2012); (q) Puri, M. et al., Food Chem. 132(3):1113-1120 (2012); (r) G. Roopa Reddy, G, A.Bhaskar Rao, A, and Yadav J S (Indian patent No: 0033NF 2011 dated Sep. 2, 2011.) Indian patent Application no: 2288/del/2011. (s) Rao, A B et al.; Adv Biosci. Biotechnol. 3:327-335 (2012); (t) Das, A et al., Sep. Purif. Technol. 144 (C):8-15 (2015).

Accordingly, there is a need to develop an improved enzyme-assisted extraction process of steviosides from the leaves of *Stevia rebaudiana Bertoni* and to identify the necessary experimental conditions in isolation of total steviosides.

BRIEF SUMMARY

Certain embodiments provide a state-of-the-art enzyme-assisted extraction (EAE) process which includes multi stage membrane filtration/purification carried out by micro filtration (MF), ultra filtration (UF) and nano-filtration (NF) membranes, to obtain the steviosides present in the leaves of *Stevia rebaudiana Bertoni* with high purity and superior organoleptic properties. In particular, certain embodiments provide a process for the extraction, separation and purification of steviol glycosides from the leaves of *Stevia rebaudiana Bertoni*, the process comprising pretreating powdered *Stevia* leaves with one or more enzymes to form enzyme pre-treated *Stevia* leaf powder. In some embodiments, the one or more enzymes is selected from the group consisting of cellulase, hemicellulose, and pectinase.

According to certain embodiments, the process further comprises pretreating the powdered *Stevia* leaves with a metal salt in combination with the one or more enzymes. In certain embodiments, the metal salt comprises at least one of NaCl, $CaCl_2$, or $FeCl_3$.

In accordance with certain embodiments, the process further comprises extracting sweet glycosides from the enzyme pre-treated *Stevia* leaf powder via pressurized hot water extraction to form a crude Stevioside extract. In such embodiments, pressurized hot water extraction comprises soaking the enzyme pre-treated *Stevia* leaf powder in water in a pH range of 6-9, and extracting the sweet glycosides from the enzyme pre-treated *Stevia* leaf powder at a pressure of 10-20 lb and a temperature of 100-120° C.

According to certain embodiments, the process further comprises passing the crude Stevioside extract through a micro-filtration membrane to form an aqueous *Stevia* extract.

In accordance with certain embodiments, the process further comprises passing the aqueous *Stevia* extract through an ultra filtration membrane (UF) having a pore size 0.01-005 µM and defined molecular weight cut off (MWCO) of 5-10-30 kDa at a trans-membrane pressure of 200-800 kPa, and a temperature range from 30-55° C. to form a clarified *Stevia* permeate. In some embodiments, the clarified *Stevia* permeate comprises about 80% color clarity and impurity removal.

According to certain embodiments, the process further comprises passing the clarified *Stevia* permeate through a nano filtration membrane (NF) of MWCO of 150-300 Da at a trans-membrane pressure of 1500-2500 kPa and a temperature in the range of 30-45° C. in order to concentrate the Steviosides in an NF retentate.

In accordance with certain embodiments, the process further comprises extracting the NF retentate into a polar solvent to form a separated organic layer comprising sweet glycosides. In some embodiments, the polar solvent comprises at least one of methanol, ethanol, n-butanol, or ethyl acetate.

According to certain embodiments, the process further comprises alternatively washing the separated organic layer comprising sweet glycosides with water of pH 2-10 and at least one of a basic material or a mineral acid at 30-45° C. temperature. In some embodiments, the basic material comprises at least one of calcium hydroxide, calcium carbonate, or potassium hydroxide, and the mineral acid comprises $FeCl_3$, HCl, or phosphoric acid.

In accordance with certain embodiments, the process further comprises concentrating the Steviosides via an organic solvent or solvent crystallization using at least one non-polar solvent.

BRIEF DESCRIPTION OF THE SEVERAL VIEW OF THE DRAWING(S)

Having thus described the invention in general terms, reference will now be made to the accompanying drawings, which are not necessarily drawn to scale, and wherein:

FIG. 23 illustrates the effect of the extraction time on Stevioside content according to certain embodiments;

FIG. 24 illustrates the effect of the number of extractions in isolation of steviosides according to certain embodiments; and FIG. 25 illustrates the effect of temperature on Stevioside content according to certain embodiments.

DETAILED DESCRIPTION

Figure 1:
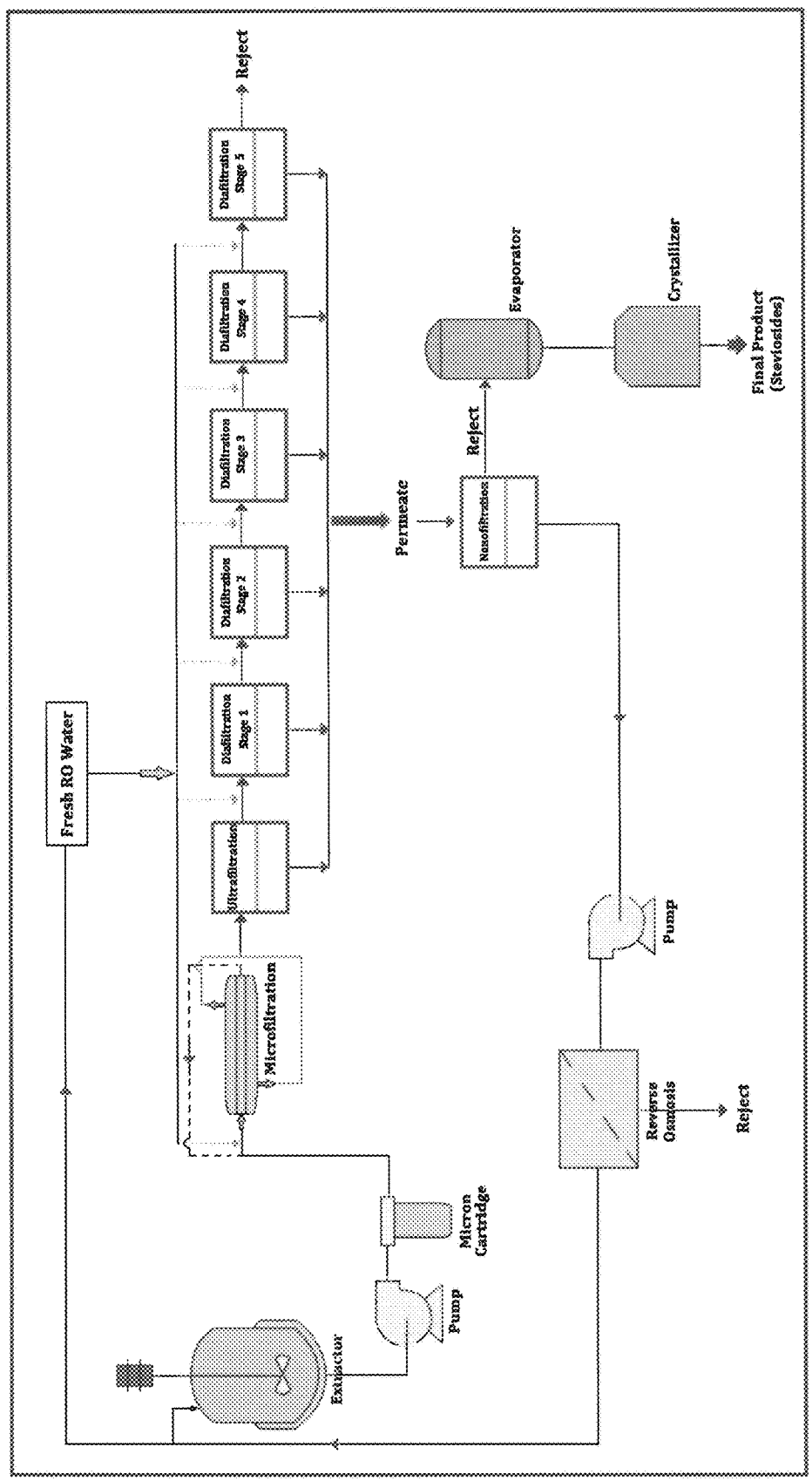
FIG. 1 is a schematic diagram for the production of *Stevia* sugar according to certain embodiments.

Certain embodiments are directed to developing a state-of-the-art enzyme-assisted extraction (EAE) process which includes multi stage membrane filtration/purification carried out by micro filtration (MF), ultra filtration (UF) and nano-filtration (NF) membranes, to obtain the steviosides present in the leaves of *Stevia rebaudiana Bertoni* with high purity and superior organoleptic properties. In particular, certain embodiments provide a simple and improved/enhanced process for increasing the isolated yield of steviosides from the leaves of *Stevia*, and methods to overcome the disadvantages associated with the extraction process by membrane separation, like bitterness and disagreeable after-taste. The process for extraction of steviosides from *Stevia* leaves is represented in FIG. 1.

The present invention relates to an efficient and green process in the extraction of sweet glycosides: Stevioside and Rebaudioside-A from the leaves of *Stevia rebaudiana*.

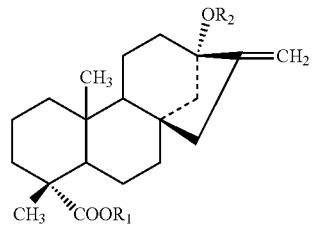

| Compound name | R1 | R2 |
|---|---|---|
| 1. Steviol | H | H |
| 2. Stevioside | β-glucose | β-glucose-β-glucose(2-1) |
| 3. Rebaudiosite-A | β-glucose | β-glucose-β-glucose(2-1), β-glucose(3-1) |

The present invention relates to a novel process of isolation and purification of sweet glycosides from the leaves of *Stevia rebaudiana* plant. The *Stevia* leaf was powdered (30-50 mesh) and suspended in 0.1M acetate buffer, pH-5. To this was added the hydrolytic enzymes (cellulase, hemicellulase and pectinase) and the reaction mixture was incubated for 4 hours in a shaking incubator. The obtained aqueous extract was subjected to pressurized hot water extraction using an autoclave. After extraction of the steviosides into the aqueous solution, the water was subjected to multi-stage membrane filtration/purification carried out by micro membrane filtration (MF), ultra membrane filtration (UF) and nano membrane filtration (NF), to obtain a water extract rich in steviosides. The obtained concentrated extract was extracted into the organic phase. The resultant organic layer was than washed with basic/acidic solutions.

The separated organic layer was concentrated and crystallized to obtain high yields 72% with 95-98% pure steviosides.

This study establishes a continuous isolation technique of steviosides from Stevia leaves by integrating a pressurized hot water extraction process followed by a multi-stage membrane based separation technique for the clarification process, using inexpensive membranes for removing pigments, high molecular weight impurities and obnoxious residues. The process also improves the taste, palatability and antioxidant activity of the isolated steviol glycosides. Thus, this study establishes a simple "green" method of extraction of steviosides using a multi-stage membrane based purification technique under viable, economical (saving time and energy) and eco-friendly conditions.

Having described the basic aspects of the invention, the following examples are given to illustrate specific experimental aspects.

EXAMPLES

The following examples are given by way of illustration and therefore should not be construed to limit the scope of the present invention.

Comparative Example

Steviosides are high intensity, natural, non-nutritive sweeteners that are gaining importance in different parts of the world. These sweet-glucosides are major sources of high potency sweeteners for the growing natural food market. Most of the steviosides extraction processes known in the literature are solvent based, thus there is a need to develop high-yielding and environmentally friendly technologies to isolate steviosides with high purity and good organoleptic properties.

When compared to the existing steviosides extraction methodologies available. (a) Ishizone, H. Japan Kokai Pat 79,12,400 (1979); (b) Dobberstein, R H, Ahmad, M S. U.S. Pat. No. 4,361,697(1982); (c) Alvarez, M; Couto, ACC. Brasil Pat. 84,02,752 (1984); (d) Kutowy, O; Zhang, Q S; Kumar, A. U.S. Pat. No. 5,972,120 (1999); (e) Moraes, E P et al., Acta Scientiar. 23:1375-1380 (2001); (f) Abelyan, V H, Ghochikyan, V T., et al U.S. Pat. No. 7,838,044 B2 (2010); (g) Puri, M et al., Biotechnol. Adv. 29:781-791 (2011); (h) Phillips, K C. Stevia: steps in developing a new sweetener In: Developments in Sweeteners-3, Elsevier Applied Science, London (ed: T. H. Grenby). 1-43 (1989).

Though chemical and physical processes are known for the extraction of steviosides, the modified enzyme-assisted steviosides extraction proves to be a competitive (cost-effective) and green technology.

Extraction of steviosides from the leaves of Stevia rebaudiana was carried out under pressurized hot water in an autoclave at 10-15 lbs pressure, at a temperature of 100-120° C. for 20-30 minutes to obtain a crude extract rich in steviol glycosides.

The membrane filtration stages followed in the study were similar to our reported study with little modification. (a) Rao A B. Int. J. Food Sci. Tech. 47(12):2554-2560 (2012). Multiple filtration was followed, i.e., micro-filtration, ultra filtration and nano filtration were used in the study, showing higher flux and higher flow rates, thus completing the filtration in a shorter time to get a reasonably clear permeate, and the complete process was simple and inexpensive.

Our study confirms the feasibility of enzyme-assisted extraction, in combination with in-expensive multi-stage membrane based separation process that helps in removing impurities and obnoxious residues present in the extract, thus improving the yields and taste profile of the steviosides isolated. The methodology developed was simple, fast, efficient and cost-effective. The process of extraction was eco-friendly, with high yields and good organoleptic properties, and the process does not require much energy in comparison to conventional processes.

Enzyme-Assisted Extraction (EAE):

Dried leaves of Stevia rebaudiana used in this study were purchased from the local market and their taxonomic identification was confirmed. All the solvents and HPLC grade solvents used in the study were purchased from Merck India. Food-grade enzymes: cellulase (10 U/mg), hemicellulase (0.3-3 U/mg) and pectinase (8-12 U/g) were purchased from HiMedia Pvt. Ltd. The standard Stevioside hydrate and Rebaudoside-A were purchased from Sigma, USA.

The dried leaf powder (ground to 10-30 mesh) of Stevia rebaudiana (2-5 kg) was taken into a conical flask containing aqueous buffer of pH 4-7 in different ratios (1:5, 1:10, 1:15, 1:20, 1:25). To this was added different concentration of enzymes: cellulase, hemicellulase and pectinase, at different concentrations (0.5% to 5%w/v), temperatures (0-55° C.) and times (4-6 hours). The reaction medium was incubated in an orbital shaker for a period of 1 to 6 hours. Later, the whole of the leaf extract was subjected to extraction in a pressure reactor 10-20 lbs to temperatures of 90-140° C. for 0-30 minutes. On completion of the extraction process, the plant material was separated by filtration to obtain a crude leaf extract containing steviosides. This crude fraction of extract was purified through a multiple membrane filtration system to isolate pure steviosides.

Example 1

Extraction of Stevioside from Stevia Plant

The extraction of steviosides from the Stevia rebaudiana leaves was carried out using different enzymes: cellulase (10 U/mg), hemicellulase (0.3-3 U/mg) and pectinase (8-12 U/mg).

Figure 2:
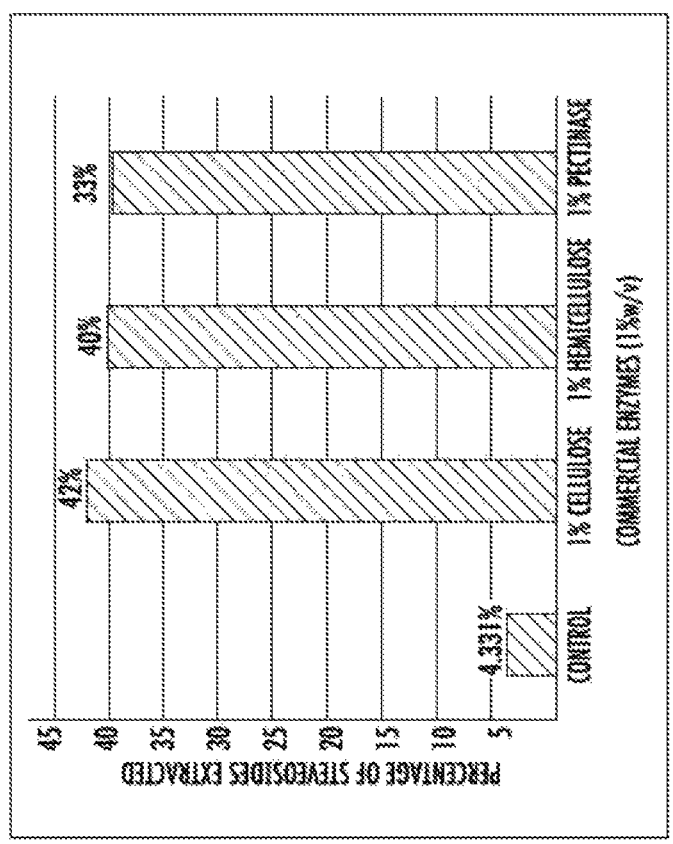
FIG. 2 illustrates the effect of different commercial enzymes on the extractibility of Steviosides.

To 100 gm of Stevia leaves in 600 ml of acetate buffer (pH 4.6), different concentrations of the enzymes: cellulase (60,000 U), hemicellulase (18,000 U) and pectinase (48,000 U) were added and incubated for 4 hours. The reaction was terminated by heating in boiling water for 30 minutes, followed by isolation of the steviosides present in the medium through continuous membrane filtration for clarification and purification to isolate pure steviosides as shown in FIG. 2.

Example 2

Extraction of Stevioside from Stevia Plant

Synergism between two enzymes plays a major role in enhancing the extraction of natural products, therefore in this study it was planned to explore the effective isolation of steviosides using accessory enzymes. (a) Li, J. Bioresour. Tech. 155:258-265 (2014), (b) Kostylev, M et al., Biofuels 3:61-70 (2012), (c) Puri, M et al., Trends Biotechnol. 30: 37-44 (2012).

The extraction of steviosides from the Stevia leaves was carried out using a combination of two different enzymes: cellulase 10 U/mg, hemicellulase 0.3-3 U/mg and pectinase 8-12 U/mg.

Figure 3:
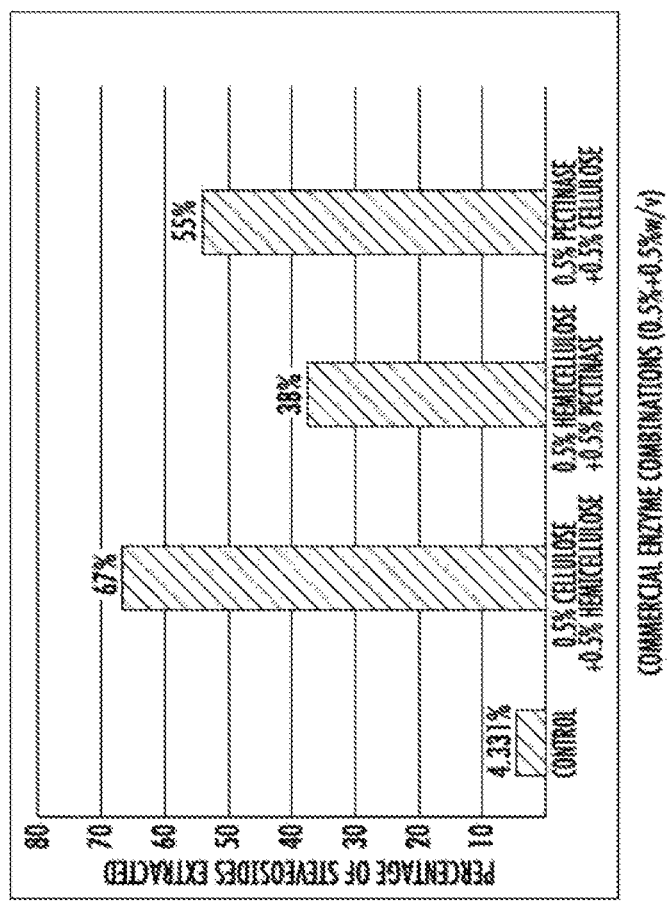
FIG. 3 illustrates the effect of combination of different commercial enzymes on the extractability of Steviosides according to certain embodiments.

To the reaction medium of 600 ml of acetate buffer (pH 4.6), 100 gm of *stevia* leaves were added. To this, different concentrations of enzymes: cellulase (30,000 U)+hemicellulase (9,000 U), hemicellulase (9,000 U)+pectinase (24,000 U), pectinase (24,000 U)+cellulase (30,000 U), were added. The reaction medium was incubated for 4 hours. The reaction was assessed at 30 minute intervals. It was then terminated by heating in boiling water for 30 minutes, followed by isolation of steviosides present in the medium by continuous membrane filtration for clarification and purification to isolate pure steviosides as shown in FIG. 3.

Example 3

Extraction of Stevioside from *Stevia* Plant

Metal salts are known to effect the isolation of phytochemicals from natural sources. a) Liu, C G. Carbohydr. Res. 341:2550-2556 (2006); b) Liu, L et al., Bioresour. Technol. 100:5853-5858 (2009). In this study, different metals salts were used along with the enzymes to enhance the hydrolysis of polysaccharides to liberate the steviosides from the leaves. Metal salts (0.1M NaCl, $CaCl_2$, $FeCl_3$ etc.) are known to hydrolyze polysaccharides- cellulose and hemicellulose, thus effectively increasing the monosaccharide concentration.

Figure 4:
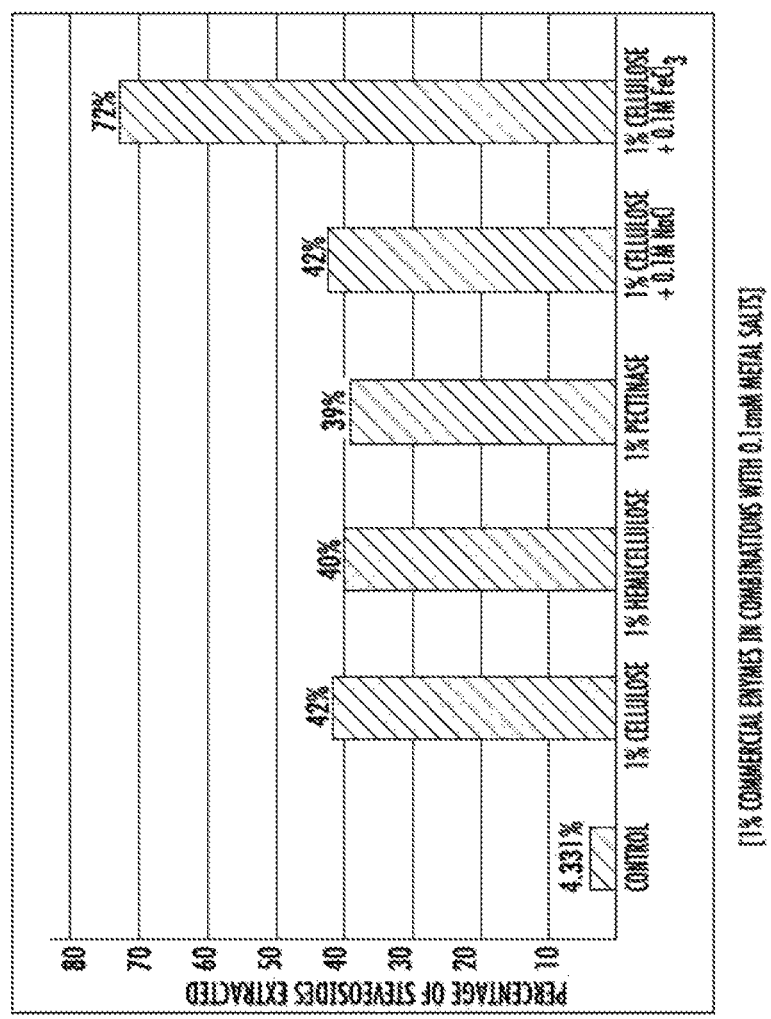
FIG. 4 illustrates the effect of commercial enzymes assisted with mineral salts on Stevioside extraction according to certain embodiments.

To 600 ml of acetate buffer (pH 4.6), 100 gm of *Stevia* leaves were added. To this, different concentrations of enzymes: cellulase (30,000 U), hemicellulase (9,000 U), pectinase (24,000 U), cellulase (30,000 U)+0.1MNaCl, cellulase (30,000 U)+0.1M$FeCl_3$ were added. The reaction medium was incubated for 4 hours. The reaction was assessed at 30 minute intervals. The reaction was terminated by heating in boiling water for 30 minutes, followed by isolation of steviosides present in the medium, followed by isolation of steviosides present in the medium through continuous membrane filtration for clarification and purification to isolate pure steviosides as shown in FIG. 4.

Figure 5:
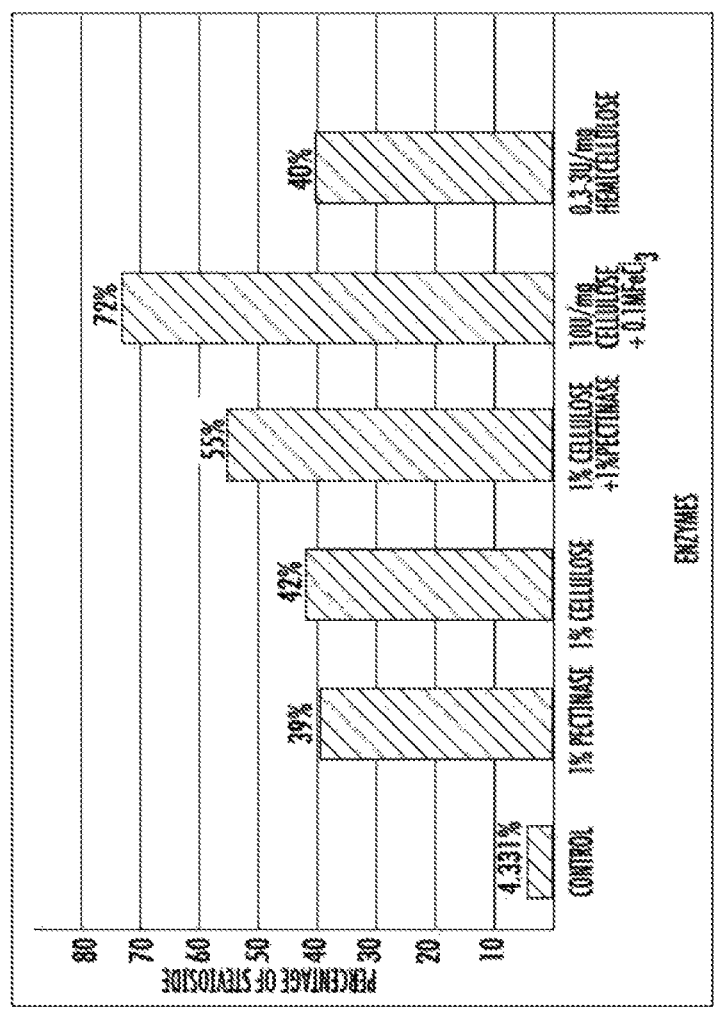
FIG. 5 illustrates the effect of different commercial enzymes on the extraction of Steviosides from *Stevia rebaudiana* according to certain embodiments.

Effect of Different Commercial Enzymes on the Extraction of Steviosides from *Stevia rebaudiana*:

The percentage of steviosides extracted was higher when the commercial enzymes (cellulase, hemicellulase, pectinase) were used in combination, in comparison to the individual enzymes. The highest recovery was achieved in using 0.1M $FeCl_3$ assisted cellulase treatment, resulting in the extraction of 90-95% of total steviosides, in comparison to conventional solvent extraction, as shown in Table 3. The yields of steviosides were higher when a combination of metal salts ($FeCl_3$) and cellulase enzyme were used when compared to different enzyme combinations. The results suggest that the combined treatment with enzymes (cellulase accompanied by metal salt $FeCl_3$) enhances the enzymatic hydrolysis in a synergistic way, due to the complete lysis of the plant cell walls, thereby improving the yield isolation of steviosides. The obtained crude extract rich in steviosides was passed through continuous membrane filters (MF, UF and NF) for clarification and purification to isolate pure steviosides as shown in FIG. 5.

TABLE 3

Percentage of steviosides isolated in the enzyme treated stevia leaves.

| Pre-treatment | Enzyme activity | % of steviosides (HPLC) | % purity |
|---|---|---|---|
| Cellulase 10 U/mg (commercial) | 7 U/mg | 42 | 80-85% |
| Cellulase B13 (NIIST)* 0.37 U/mg No activity | crude enzyme 2.5 U/mg (60% $(NH_4)_2SO_4$) | 28 | 62-65% |
| Cellulase B 21 (NIIST) 0.32 U//mg No activity | crude enzyme 1.8 U/mg (60% $(NH_4)_2SO_4$) | 22 | 60-62% |
| Pectinase (commercial) | 8-12 U/mg | 39 | 81-84% |
| Cellulase + Pectinase (comm.) | 7 U/mg | 55 | 78-82% |
| Cellulase 10 U/mg + 0.1 M $FeCl_3$ | 7 U/mg | 72 | 90-95% |
| Hemicellulase 0.3-3 U/mg | 2.5 U/mg | 40 | 70-73% |

*(NIIST-Trivandrum has supplied cellulase the enzyme activity was found low)

Example 4

Purification of Steviosides

The present invention relates to an integrated membrane separation method, wherein the combined use of microfiltration (MF), ultrafiltration (UF) and nanofiltration (NF) (ceramic or polymeric or tubular, single or multi-channel) was applied to recover steviosides of desired purity from the crude enzyme treated extract, obtained from the leaves of *Stevia rebaudiana Bertoni*. A representation of the process for extraction of steviosides from *Stevia* leaves is shown in FIG. 1.

4-7 kg of crude *Stevia rebaudiana Bertoni* leaf powder were initially treated with 30-40 liters of hexane for a period of 2-3 hours at 50-60° C. with total reflux to remove plant pigments and waxes etc. from the leaf powder. After reflux, the hexane was removed and the dry leaves were subjected to pressurized hot water extraction to obtain a crude extract rich in steviosides.

The obtained aqueous extract solution of 40-70 liters was initially pre-filtered using a micron cartridge (polypropylene rope) to remove higher molecular weight colloids and suspended solids. The filtrate was then passed through a ceramic microfiltration tubular module of 0.1-0.5 $m^2$ area to remove suspended particles. The experiment was carried out in batch mode at an operating pressure of 0-2 kg/$cm^2$ and temperature of 25-30° C. until a permeate recovery of 90-97% containing Steviosides 4 -5%.

The obtained permeate (40-70 liters) from the MF system was fed to a spiral wound UF membrane module (10-30 kDa molecular weight cut-off (MWCO) and 0.5-1.5 $m^2$ membrane area), operated at a feed pressure of 5-9 kg/$cm^2$ and temperature of 25-28° C. The experiment was carried until a permeate recovery of 80-90% was achieved with a steviosides concentration of 128-266 gm. The permeate from the UF system was then fed to a series of 4-6 diafiltration (DF) units to further recover steviosides by washing out undesirable high molecular weight impurities. The permeate from each diafiltration step was collected and processed using hydrophilized polyamide NF membrane of 150-250 Da MWCO and 0.8-1.5 $m^2$ membrane area, at a feed pressure of 15-21 kg/$cm^2$ and temperature of 28-30° C. until a water recovery of 80-90% was achieved. All the experiments were carried out in batch mode with the reject line recycling the feed back to the feed tank. The process developed by combining MF, UF and NF processes shows a greater potential of steviosides recovery. The aqueous concentrate from the NF system was washed with organic solvents like n-propanol/n-butanol/isopropanol/toluene/pentane etc. The organic rich steviosides solution was separated and concentrated.

Percentage of Steviosides Recovered:

The water flux (J) through the membrane and % stevioside recovered during each process is given by following equations:

$$J = \frac{W}{t \times A}$$

$$\% \text{ recovery of } \textit{steviosides} = \frac{C_p}{C_f} \times 100$$

Where, W is amount of permeate obtained, t is time taken, A is effective membrane area, $C_p$ is concentration of steviosides in permeate and $C_f$ is concentration of steviosides in feed.

Figure 6:
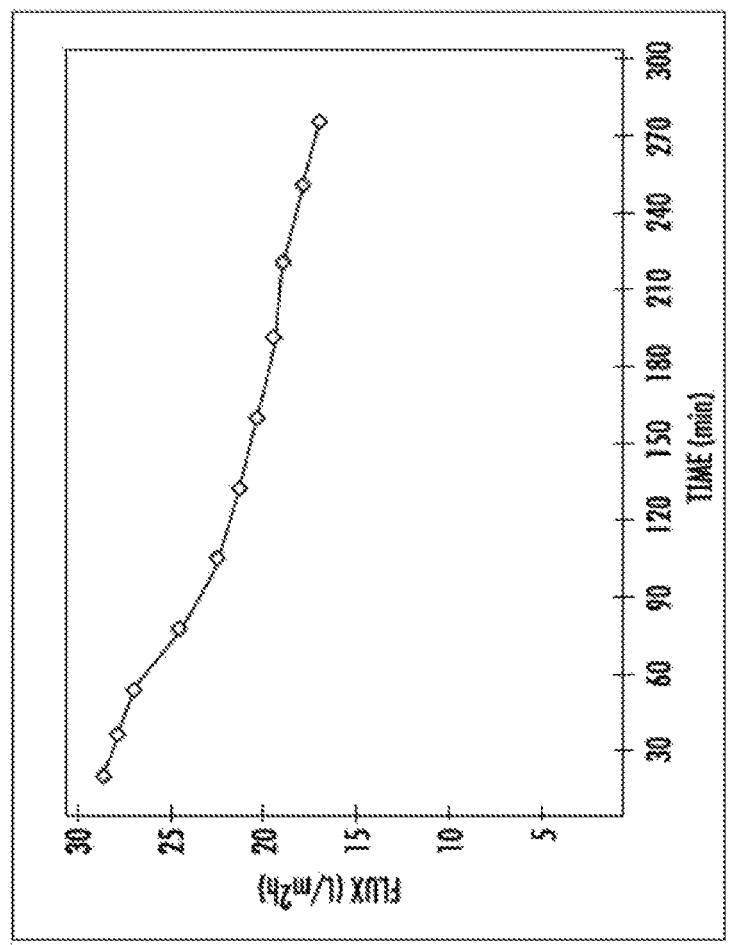
FIG. 6 illustrates variation of flux with time using ceramic tubular microfiltration module according to certain embodiments.
Figure 7:
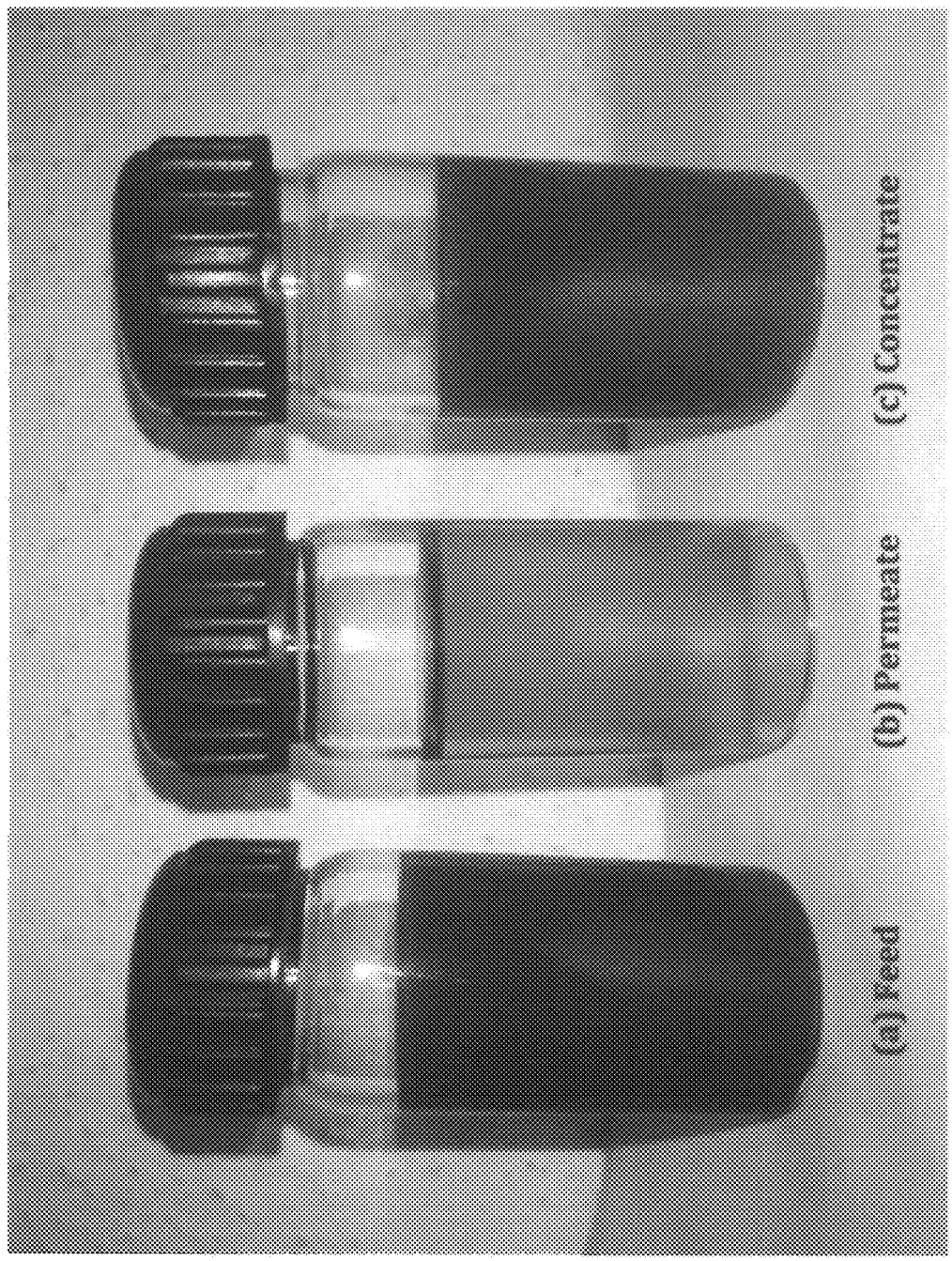
FIG. 7 is a photograph of MF samples for feed, permeate, and concentrate according to certain embodiments.

Microfiltration: A ceramic tubular microfiltration membrane of 0.2-0.8 m$^2$ cross section area and 0.1-0.5 μm pore size is used for the pretreatment of the crude Stevia rebaudiana leaf extract. FIG. 6 shows the variation of permeate flux with time at a feed pressure of 0-2 kg/cm$^2$ and ambient temperature (30° C.). Initially the permeate flux declines slowly from 28 to 26 L/m$^2$h for the first 51 minutes, thereafter a gradual reduction in flux value from 26 to 16.25 L/m$^2$h is observed, which is due to higher solute concentration and accumulation of larger molecular weight particles and foul ants over the membrane surface. The photograph of feed, concentrate and permeate samples is shown in FIG. 7. It can be clearly observed that the ceramic membrane showed efficient removal of higher molecular weight impurities such as suspended solids, waxes, colloidal matter and color imparting pigments. The results of % steviosides present in initial feed, final concentrate and permeate samples is tabulated in Table 1.

TABLE 1

Concentration of steviosides in feed, permeate and concentrate samples of MF

| Sample | % Steviosides |
|---|---|
| Feed | 4.8 |
| Permeate | 4.75 |
| Concentrate | 0.25 |

Figure 8:
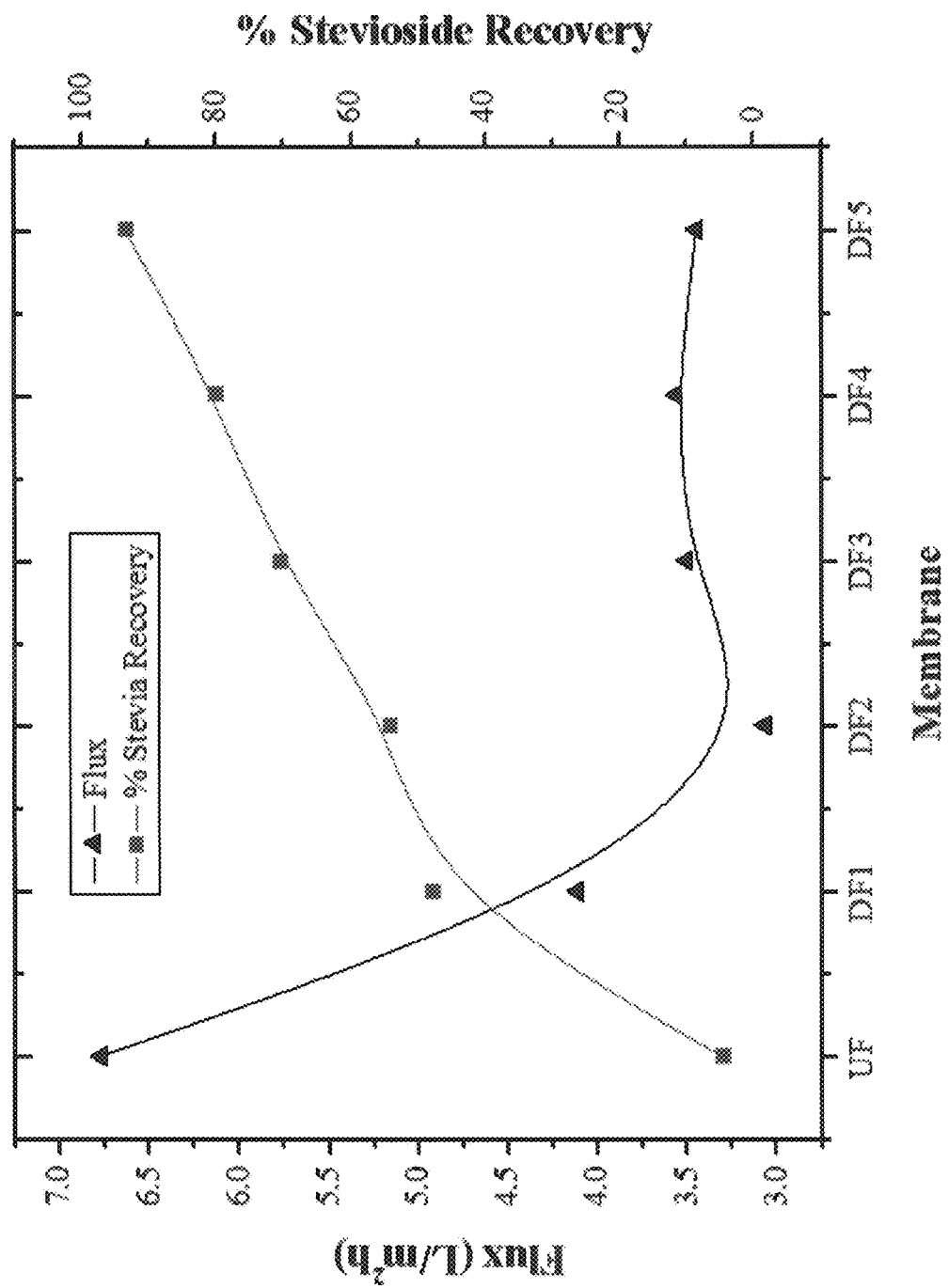
FIG. 8 illustrates variation of flux and % Steviosides recovery for a UF-DF integrated membrane process according to certain embodiments.

Ultrafiltration: Ultrafiltration (UF) experiments were carried out using a spiral wound polyethersulphone membrane of 10-30 kDa MWCO and 0.8-1.5 m$^2$ surface area at feed pressure of 5-7 kg/cm$^2$ and operating temperature of 25-30° C. The permeate from the MF process is allowed to pass through the UF system followed by a series of 4-6 DF stages. Initially 20-25 liters of MF permeate were charged into the feed tank and allowed to pass through the UF membrane until a permeate recovery of 70-80% was obtained. The reject from the UF system was fed to a series of 4-6 DF units to further recover steviosides by washing out undesirable impurities. The feed, permeate and concentrate samples in each step were analyzed using HPLC analysis to determine the concentration of steviosides. FIG. 8 shows the flux variation and % steviosides recovery for UF and DF processes. A maximum permeate flux of 6 to 14 L/m$^2$h is obtained for UF process followed by sharp decline in flux value for DF process which can be attributed to increased osmotic pressure as well as accumulation and deposition of solute particles over the membrane surface and within the pores.

Figure 9:
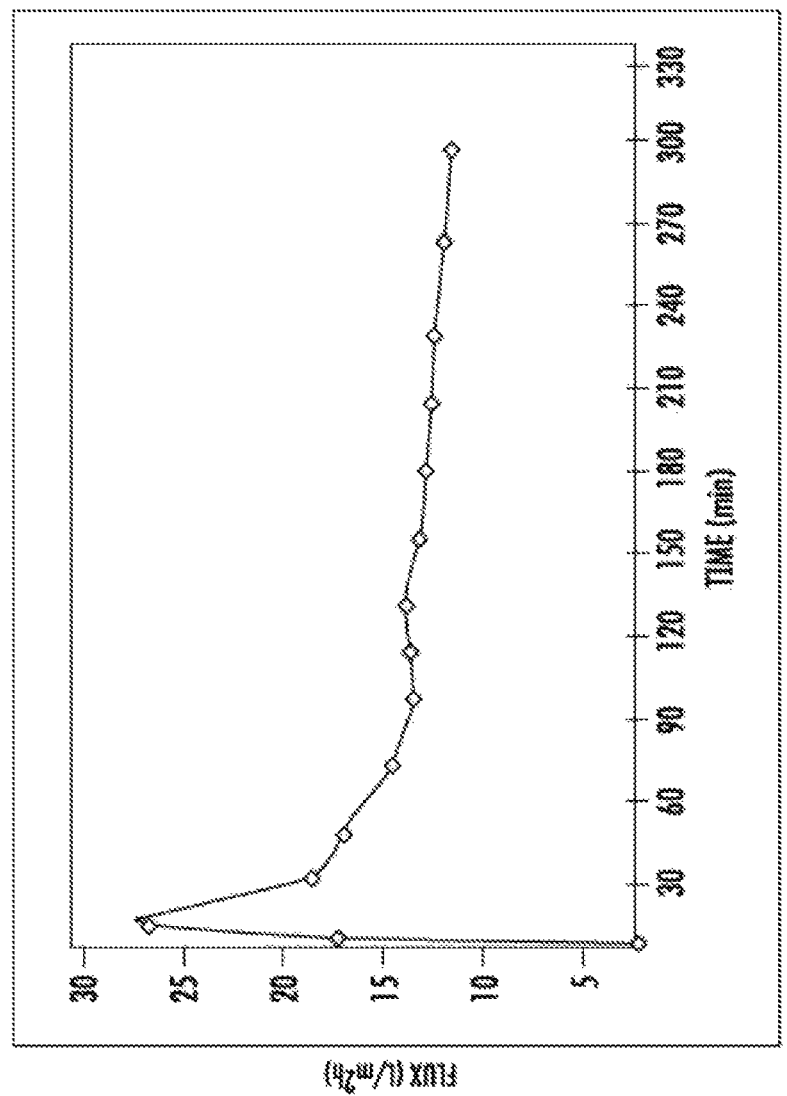
FIG. 9 illustrates variation of permeate flux and concentration of Steviosides in feed with operating time for an NF process according to certain embodiments.

Nanofiltration: The permeate obtained from UF-DF integrated system was passed through a NF membrane (hydrophilized polyamide) of 150-250 Da MWCO and 0.8-1.5 m$^2$ membrane area at feed pressure of 15-21 kg/cm$^2$ and operation temperature of 25-30° C. (FIG. 9). It was observed that NF membrane showed higher retention of steviosides from 70-95% with a water flux of 200-230 L/m$^2$h. The steviosides rich NF retentate was extracted with an organic solvent to isolate steviosides of 80-85 purity.

Percentage (%) steviosides (Stevioside or Rebaudioside-A) recovered after the purification process, was calculated.

$$\% \text{ yield of } \textit{Steviosides} = \frac{\text{Conc. of } \textit{Steviosides} \text{ in the crude extract}}{\text{Conc. of } \textit{Steviosides} \text{ in the permeate}} \times 100$$

Figure 10:
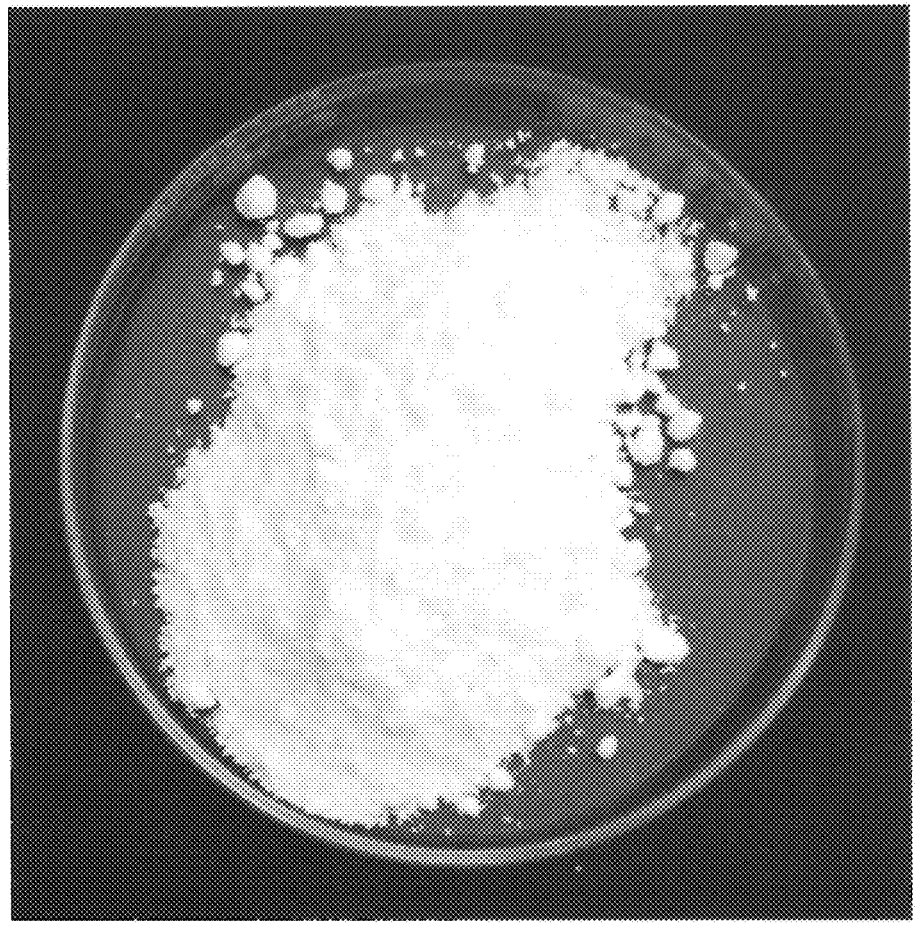
FIG. 10 is a photograph of final *Stevia* product of 95-98% purity using an overall MF-UF-NF integrated membrane process configuration according to certain embodiments.
Figure 11:
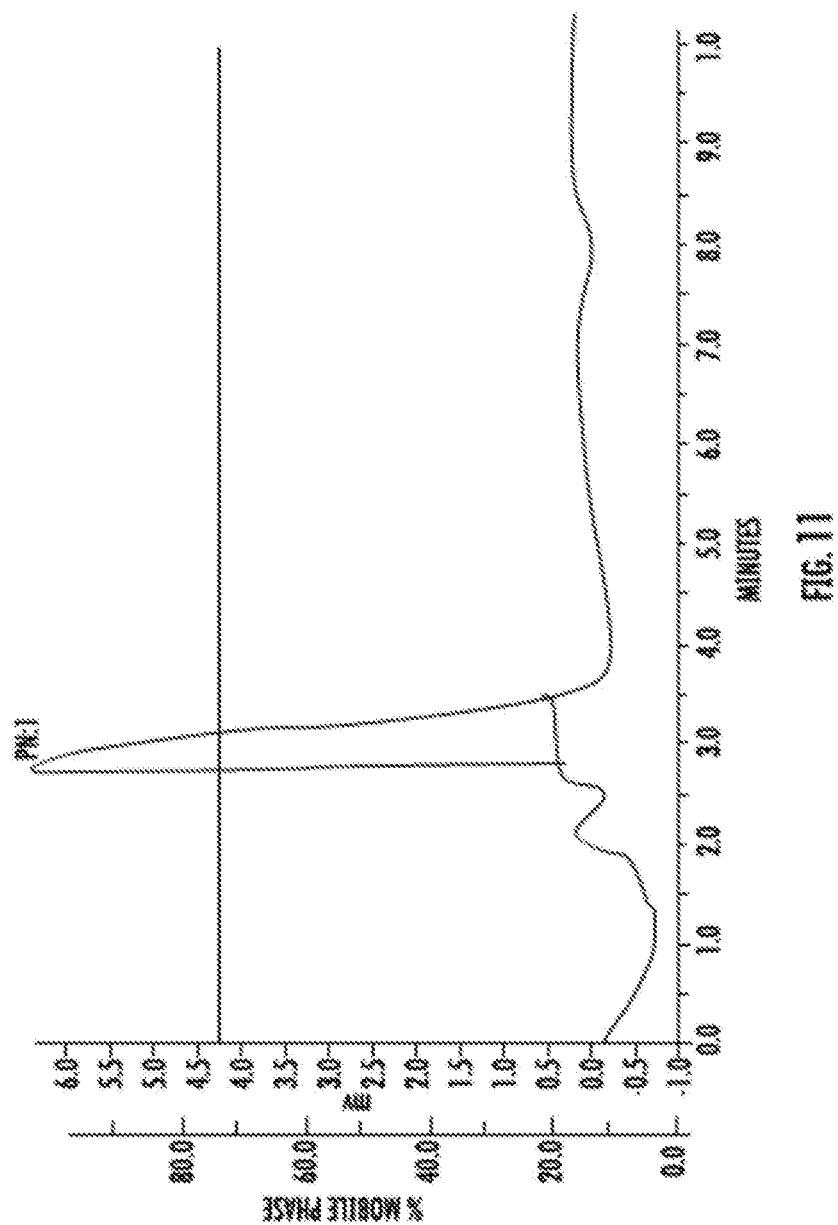
FIG. 11 is an HPLC chromatogram of standard Stevioside hydrate.
Figure 12:
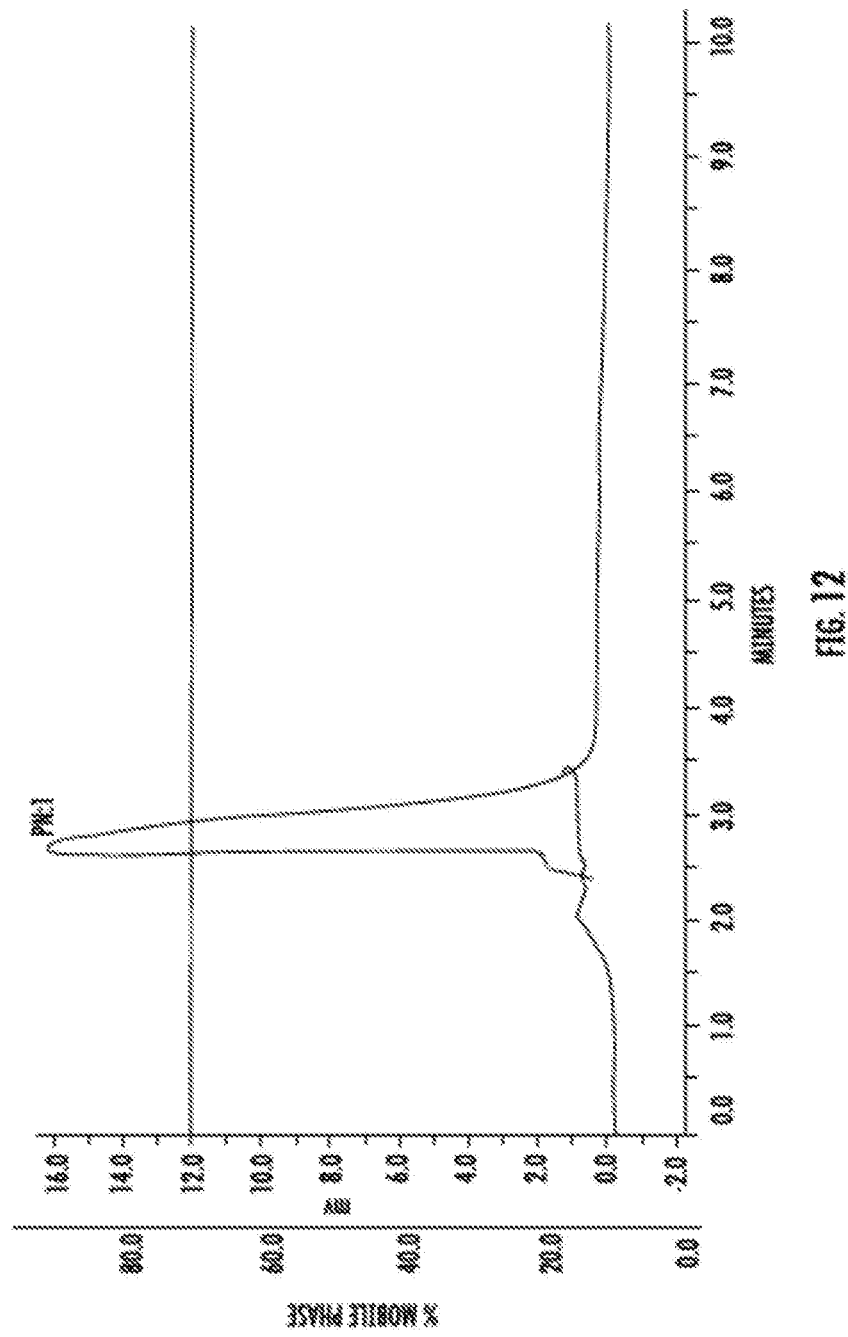
FIG. 12 is an HPLC chromatogram of extracted Stevioside hydrate according to certain embodiments.
Figure 13:
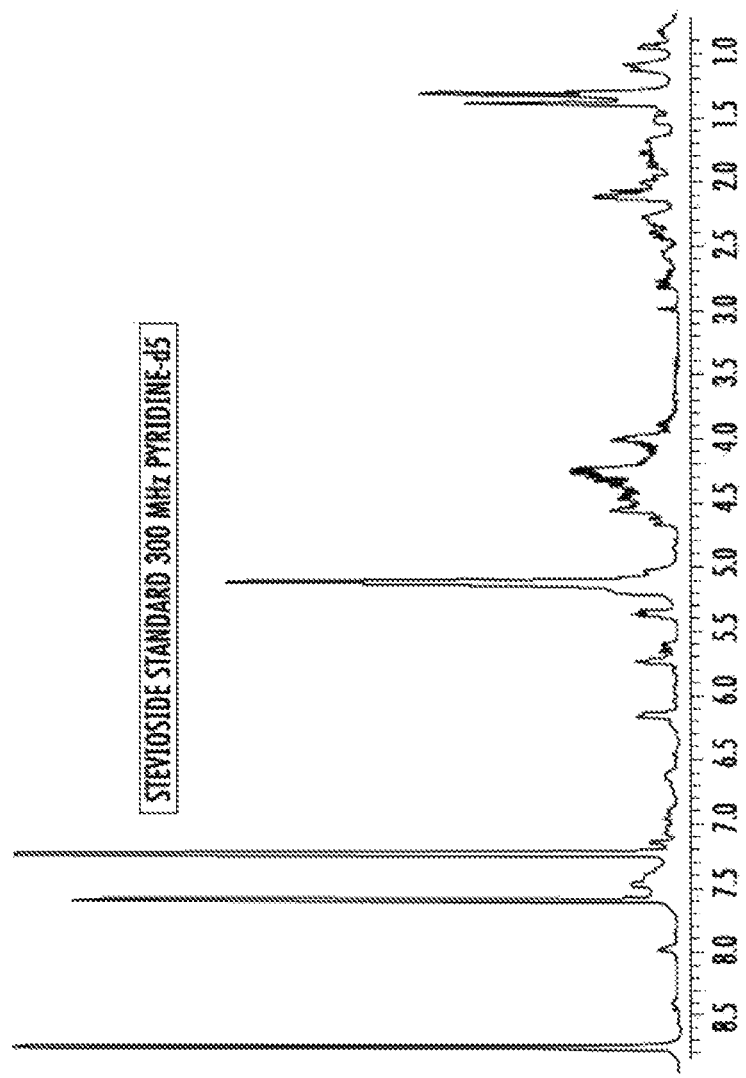
FIG. 13 is an $^1H$ NMR spectrum of standard Stevioside hydrate.
Figure 14:
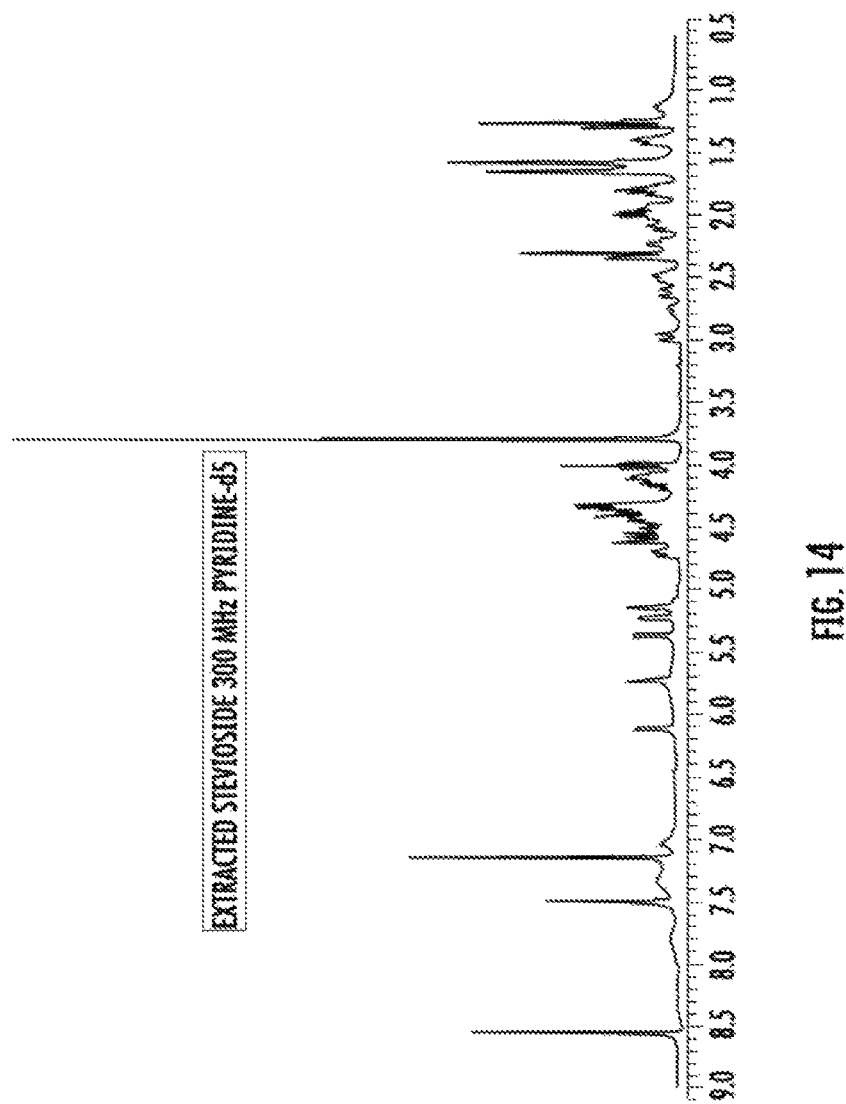
FIG. 14 is an $^1H$ NMR spectrum of extracted Stevioside hydrate according to certain embodiments.
Figure 15:
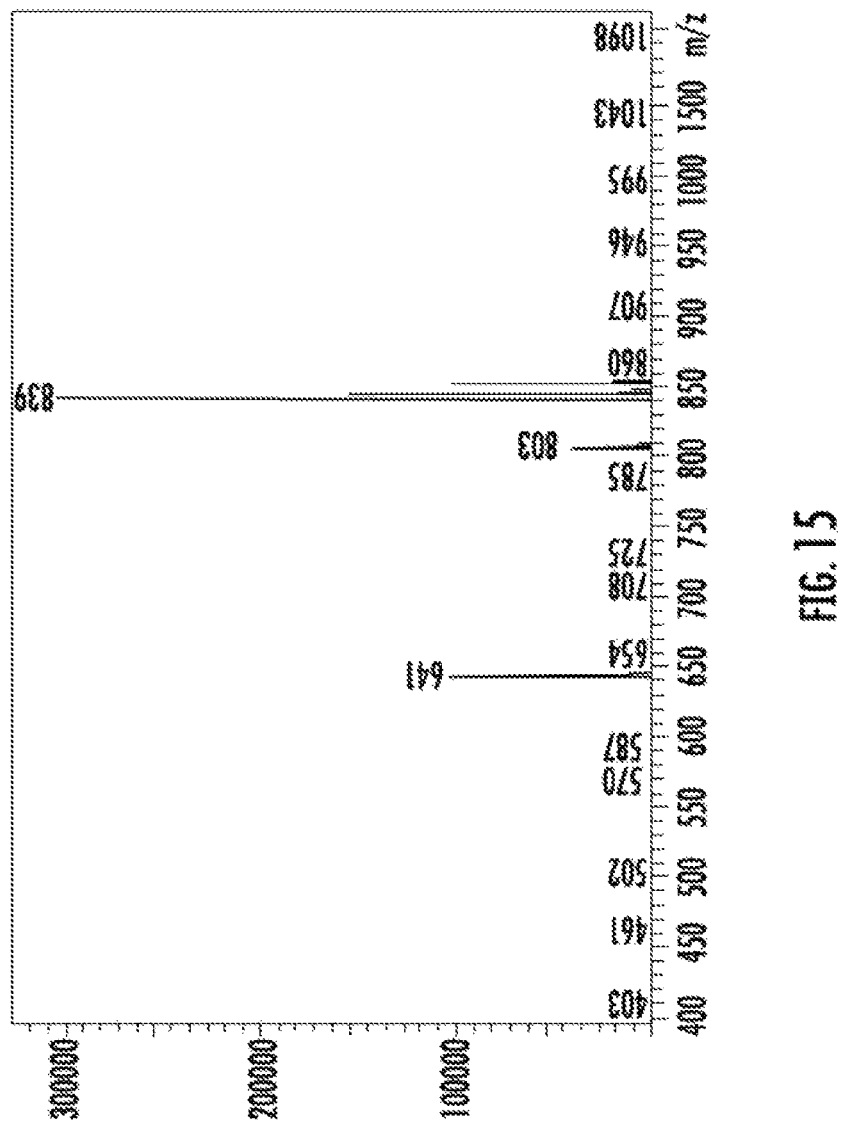
FIG. 15 is an LC-MS spectrum of standard Stevioside hydrate.
Figure 16:
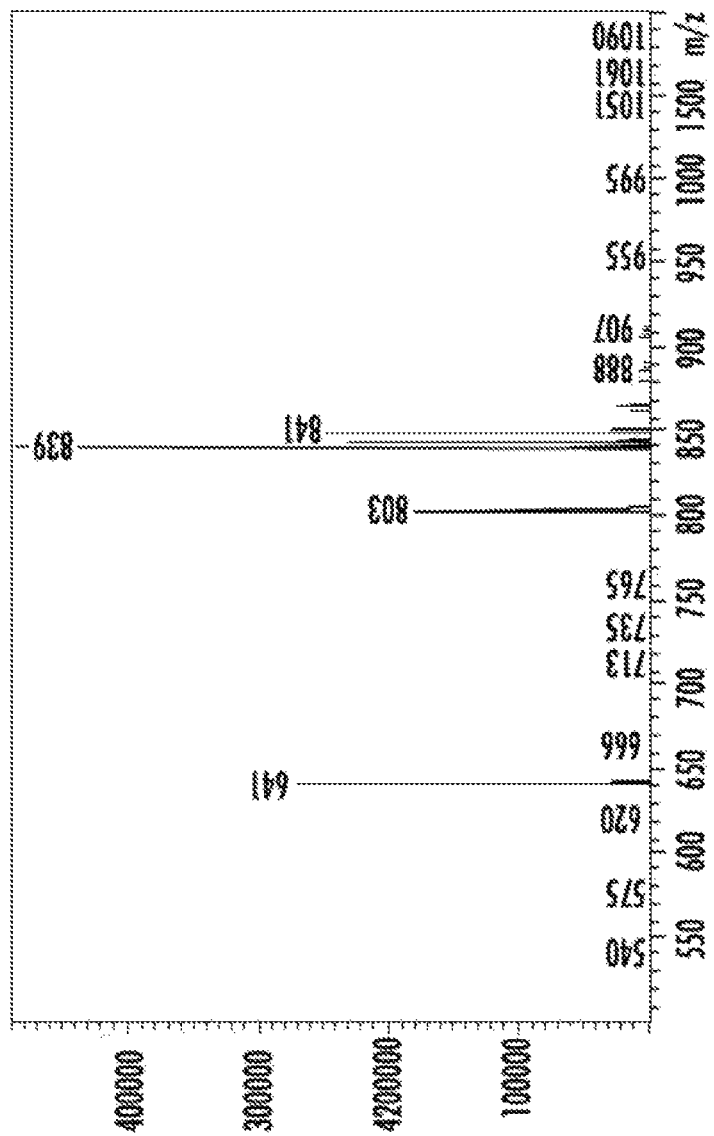
FIG. 16 is an LC-MS spectrum of extracted Stevioside hydrate according to certain embodiments.
Figure 17:
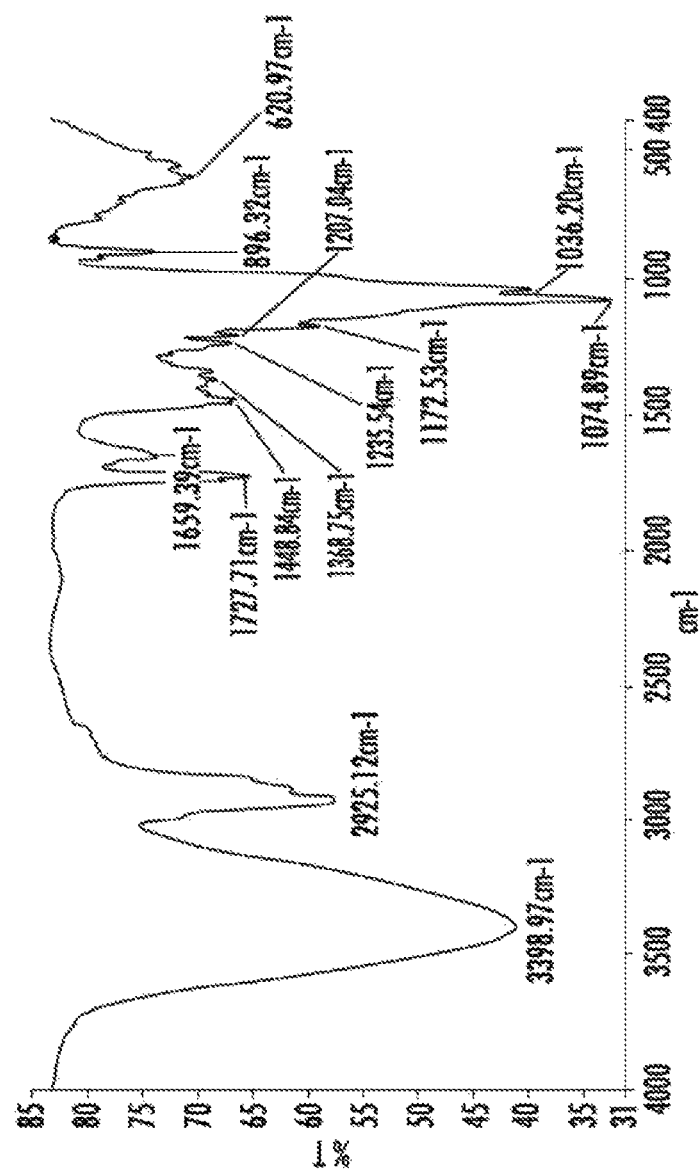
FIG. 17 is an IR spectrum of standard Stevioside hydrate.
Figure 18:
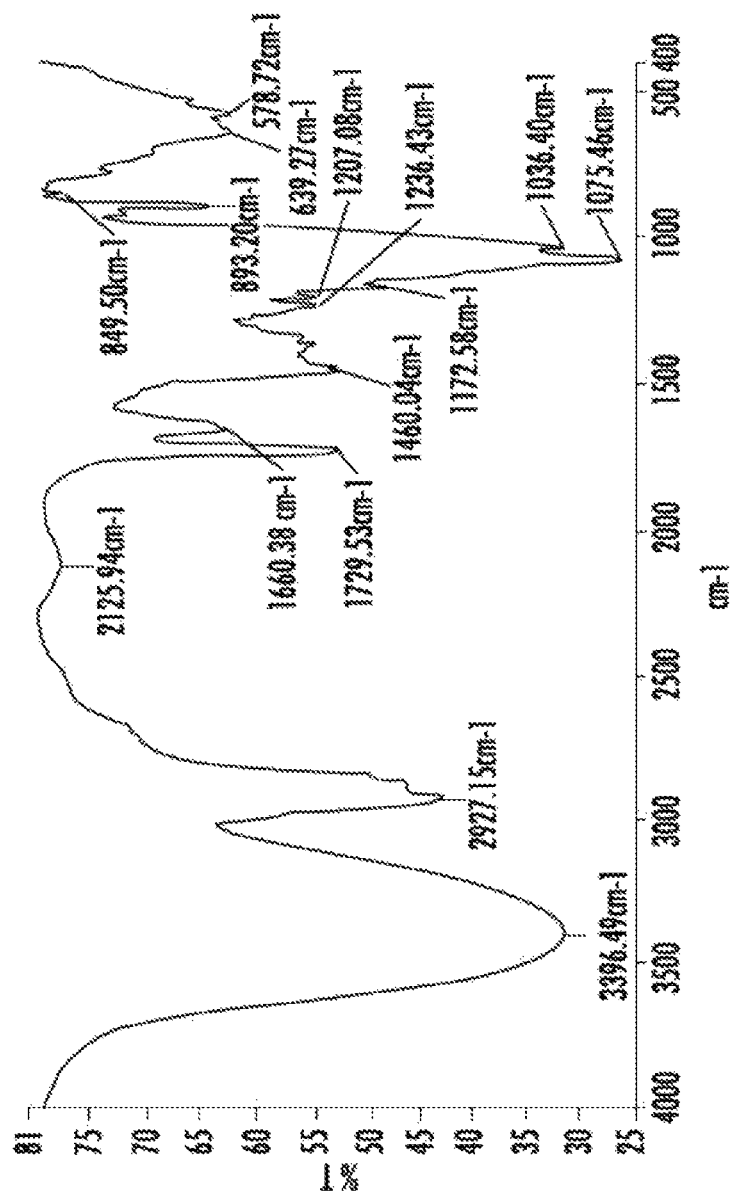
FIG. 18 is an IR spectrum of extracted Stevioside hydrate according to certain embodiments.
Figure 19:
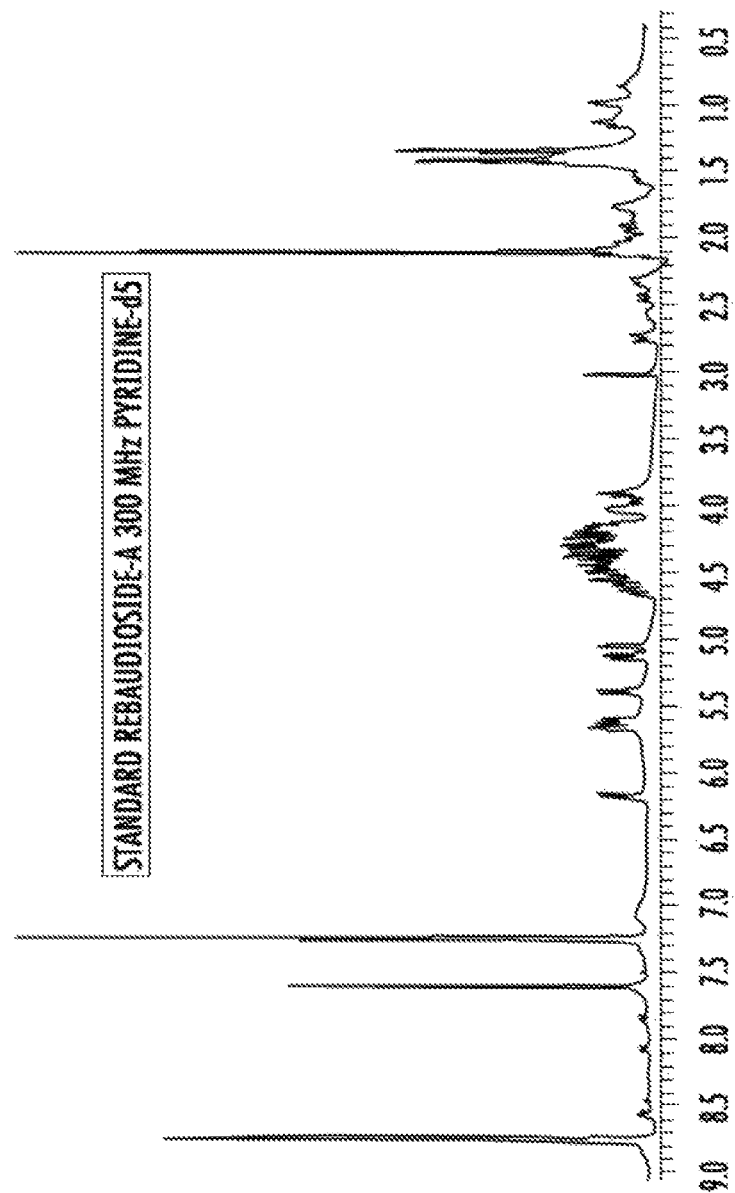
FIG. 19 is an $^1HNMR$ spectrum of standard Rebaudioside-A.
Figure 20:
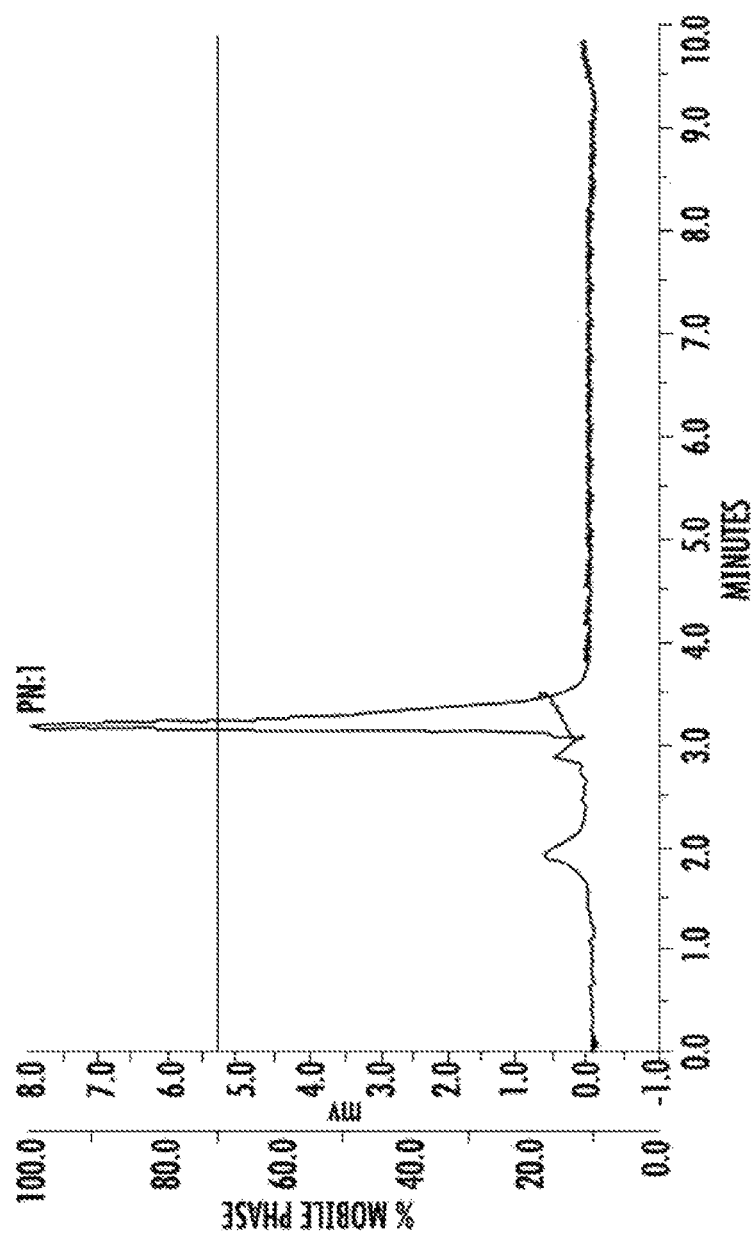
FIG. 20 is an HPLC chromatogram of standard Rebaudioside-A.
Figure 21:
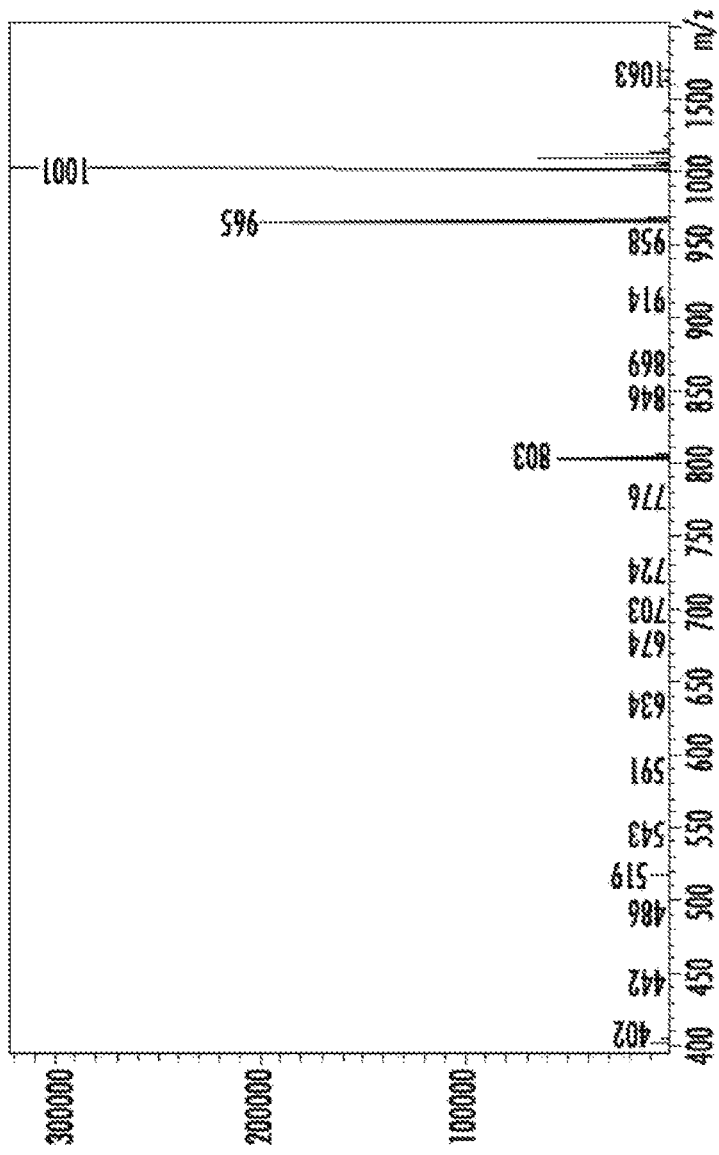
FIG. 21 is an LC-MS spectrum of standard Rebaudioside-A.
Figure 22:
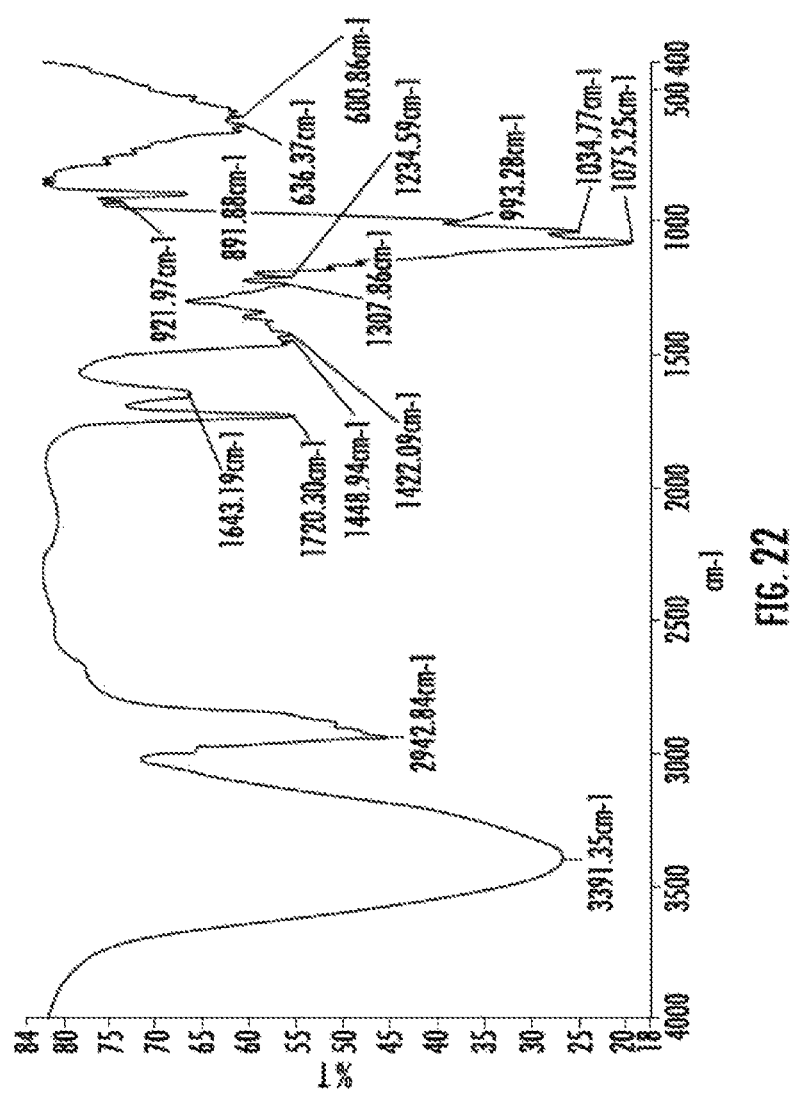
FIG. 22 is an IR spectrum of standard Rebaudioside-A.

The extracts rich in Steviosides were extracted with organic solvents like methanol/ethanol/isopropanol/butanol/hexane/toluene/pentane/ethyl acetate etc. and the organic layer was separated and washed initially with aqueous solution pH 2-10 (using powdered calcium carbonate/calcium or potassium hydroxide or strong basic resin or HCl/phosphoric acid/acidic resin). The residual precipitate formed was removed by filtration (filter press) and finally the organic layer was washed with a neutral buffer to remove high molecular weight impurities. The separated organic layer was treated with activated animal charcoal and filtered through Celite-540. The organic layer containing steviol glycosides was concentrated and dried to obtain the product. Stevioside terpenoids were obtained as a pure white powder by spray drying or by solvent crystallization, by adding polar and non polar solvents like methanol/ethanol/propanol/isopropanol/hexane/ethyl acetate/heptanes, etc. to obtain pure steviosides of purity 90-98%. FIG. 10.

The concentrations of Stevioside and Rebaudioside-A present in aqueous stevia extracts were quantified by high performance liquid chromatography (HPLC) using an NH$_2$ column (5 μm, 220×4.6 mm, acetonitrile and methanol (85:15) as the mobile phase at a flow rate of 1 ml/min, with a UV detector at a wave length of 210 nm, (a) Huang, X Y et al., Sep. Purif. Technol. 71: 220-224 (2010) (b) Gardana, C M et al., J. Chromatogr. A. 1217(9):1463-1470 (2010).

High purity steviosides were obtained, with recovery yield of 70-85%, of which Stevioside (80-85%) and Rebaudioside-A (8-10%) were present, as confirmed by HPLC analysis. The structure of the steviosides were confirmed by analytical data-$^1$H NMR, Mass and IR spectra and compared with literature values (LC-Mass chromatogram (FIG. 11-22).

Optimal Conditions Required for Extraction of Steviosides from Stevia Leaves:

A) Effect of the Time Required to extract steviosides from Stevia Leaves Content (FIG. 23):

The content of steviosides extracted from 100 gm of dry leaves was analyzed. The steviosides present in the leaves were extracted within 20-30 minutes by pressurized extraction method. No further increase was observed with the enhancement of time.

Effect of the Number of Repetitive Extraction Times on Isolation of Steviosides from the Leaves of Stevia (FIG. 24):

The content of steviosides extracted from 100 gm of dry leaves was found to be maximum in a single extraction. This was perhaps because the pressure and temperature were optimum for extraction, thus further extraction processes were not required.

C) Effect of Temperature on Isolation of Steviosides Content (FIG. 25):

The extraction of Steviosides was found to be highest when the extraction was done at 120° C. This may be because at this temperature the lysis /breakdown of the plant cell wall polysaccharides was maximum. Yaqin, X et al., Nature and Science 3(2):43-46. (2005).

D) Effect of Proportion of Solvent Added to Leaves, on the Steviosides Content:

The table shows that the content of stevioside extracted was highest when the ratio between leaves to aqueous buffer solution was 1:15 (w/v). Further increase in the ratios did not show much change in the extraction of steviosides. Yaqin, X et al., Nature and Science 3(2):43-46 (2005).

TABLE 2

Effect of ratio of solvent added to leaves, on the Stevioside content

| Mass:Solvent ratio (w/v) Leaves:aqueous solvent | % of Steviosides (g/100 g dried leaves) | Total soluble solids (g/100 g dried leaves) |
|---|---|---|
| 1:5 | 1.2 | 9.5 |
| 1:10 | 1.8 | 9.1 |
| 1:15 | 2.1 | 8.6 |
| 1:20 | 2.05 | 8.4 |
| 1:25 | 2.09 | 8 |

This study highlights the isolation of steviosides from Stevia leaves using pressurized hot water extraction and multi-stage membrane based separation process for the extraction of steviol-glycoside based sweeteners under viable, economical and eco-friendly conditions. This process has also improved the taste profile of the product as determined by preliminary studies. Thus this methodology establishes a continuous and simple clarification process of isolation of high purity sweet glycosides using inexpensive membranes in removing pigments, high molecular impurities and obnoxious residues. Therefore this modified process significantly highlights an easy operational technology without any harm to the environment. This modified process can be applied in the production of highly purified steviosides on a commercial basis.

ADVANTAGES OF THE INVENTION

The exploitation of enzymes in the food industry for extracting plant bioactives is a promising field. The enzyme-assisted extraction of natural compounds can save processing time and energy and provide a potentially more reproducible extraction process at the commercial scale.

This study demonstrates the feasibility of enzyme assisted extraction, which gives better yields than conventional extraction methodologies. When compared to existing stevioside extraction methods, the methodology developed has shown the following advantages in the isolation of steviol-glycosides in purification and in improving the taste of natural sweeteners. The enzymes used in the extraction process need not be highly purified. The highest recovery was achieved in using 0.1M $FeCl_3$ assisted cellulase treatment, resulting in the extraction of 90-95% of total steviosides with 98% purity when compared to conventional solvent extraction. The results suggest that the combined treatment with enzymes (cellulase accompanied by metal salts $FeCl_3$) enhances the enzymatic hydrolysis in a synergistic way thereby improving the isolation of steviosides. From this study it is concluded that the developed multi-stage membrane (micro-membrane, ultra-membrane and nano-membrane filters) based integrated process for the isolation of pure steviol-glycoside based sweeteners from crude Stevia rebaudiana Bertoni leaf extract is cost effective and eco-friendly in nature when compared to other conventional methods that take longer processing time.

Thus the process establishes a simple and efficient eco-friendly procedure involving pressurized hot water extraction and membrane mediated clarification and purification processes to obtain pure steviosides from the Stevia leaf extract, without impurities and obnoxious residues, using easy operational technology without risk to the environment.

Annexure XII:

26: List of Sample Patents
1. Kotesh, K J; Babu, G D K; Kaul, V K; Ahuja P S. A process for the production of steviosides from Stevia rebaudiana Bertoni. US Patent Application Publication: US 2006/0142555 A1, dated: Jun. 29, 2006. 11/022277/US; dated: Dec. 23, 2004
2. Kaul, V K; Babu, G D K; Ahuja, P S; Kumar, K J. A process for the production of steviosides from Stevia rebaudiana Bertoni. 0360NF2004/IN, dated: Dec. 31, 2014.
3. Mukhopadhyay, M; Panja, P. "An Improved process for making natural sweetener from stevia leaves" Provisional Indian Patent (1280/MUM/2008)
4. Vijayakumar, G. R; Manohar, B; Divakar, S., 2003. An enzymatic process for the preparation of alkyl glycosides. NF-512/2003.
5. Vijayakumar, G R; Manohar, B; Divakar, S, 2004. An improved enzymatic method for the preparation of glycosides. NF-165/2004.
6. Abelyan, V H; Ghochikyan, Y T et al, 2010. Extraction, Separation and Modification of sweet glycosides from Stevia rebaudiana leaves. U.S. Pat. No. 7,838,044B2, Application number: U.S. Ser. No. 11/016,781, dated: Nov. 23, 2010.
7. Deji, W., 2009. High efficiency method for continuously extracting Steviosides from Stevia rebaudiana Bertoni. Chinese Patent 200810216065.
8. Reddy, G R; Bhaskar Rao, A and Yadav, J S A simple and improved process for production of highly purified stevioglycosides from the extracts of Stevia rebaudiana. (Indian patent No: 0033NF 2011 dated Sep. 2, 2011.) Indian patent Application no: 2288/de1/2011.

19: Non-Patent Literature
1. Rajasekaran, T; Giridhar, P; Ravishankar, G A. Production of steviosides in ex vitro and in vitro grown Stevia rebaudiana Bertoni. J Sci Food Agric 87(3):420-424 (2007).
2. Rajasekaran, T; Ramakrishna, A; Udaya Shankar, K; Giridhar, P; Ravishankar G A. Analysis of Predominant Steviosides in Stevia rebaudiana Bertoni by Liquid Chromatography/Electrospray Ionization-Mass Spectrometry, Food Biotech. 22(2):179-188 (2002).
3. Das, A; Paul, D; Golder, A K; Das C, "Separation of Rebaudioside-A from stevia extract: Membrane selection, assessment of permeate quality and fouling behavior in laminar flow regime", Sep. Purif. Technol. 2015, 144(C) 8-15.
4. Puri, M et al., Downstream processing of stevioside and its potential applications. Biotechnol. Adv. 29:781-791 (2011).
5. Puri, M et al., Enzyme-assisted extraction of bioactives from plants. Trends Biotechnol. 30: 37-44 (2012).

6. Li, J. Bioresour. Tech. Synergism of cellulase, xylanase, and pectinase on hydrolyzing sugarcane bagasse resulting from different pretreatment technologies.155:258-265 (2014).
7. Liu, C G. Carbohydr. Res. The enhancement of xylose monomer and xylotriose degradation by inorganic salts in aqueous solutions at 180° C. 341:2550-2556 (2006).
8. Kostylev, M et al. Synergistic interactions in cellulose hydrolysis. Biofuels 3:61-70 (2012).
9. Moraes, E P et al., Clarification of *Stevia rebaudiana* (Bert.) Bertoni extract by adsorption in modified, zeolites. Acta Scientiar. 23:1375-1380 (2001).
10. Stevioside: Technology, Applications and Health. De, S; Mondal, S; Banerjee, S. Wiley and Sons, Copyright. (2013).

We claim:

1. A process for extraction, separation, and purification of steviosides from Stevia leaves, the process comprising:
    powdering dried Stevia leaves to 10-20 mesh size to form a Stevia leaf powder;
    removing surface wax and extracting color pigments from the Stevia leaf powder with hexane to form prepared Stevia leaf powder;
    pretreating the prepared Stevia leaf powder with an aqueous buffer having a pH of 4-7 and one or more enzymes to form a mixture and incubating the mixture for 1-6 hours to form enzyme-treated Stevia leaf powder;
    extracting steviosides from the enzyme pre-treated Stevia leaf powder via pressurized hot water extraction for 20-30 minutes in a reactor, wherein the pressurized hot water extraction comprises soaking the enzyme-treated Stevia leaf powder in hot water in a pH range of 6-9, a temperature of 100-120° C., and a pressure of 10-20 lb to form a crude extract of steviosides;
    passing the crude stevioside extract through a microfiltration membrane to form an aqueous Stevia extract;
    passing the aqueous Stevia extract through an ultra filtration membrane (UF) to form a clarified Stevia permeate;
    passing the clarified Stevia permeate through a nano filtration membrane (NF) in order to concentrate the steviosides in an NF retentate;
    extracting the NF retentate into a first polar solvent comprising n-butanol or n-propanol to form a separated organic layer comprising the steviosides;
    alternatively washing the separated organic layer comprising the steviosides with water of pH 2-10 and at least one of a basic material or a mineral acid at 30-45° C. temperature; and
    purifying the steviosides to 95-98% purity by concentrating the steviosides by spray drying with an organic solvent or by solvent crystallization using at least one of a second polar solvent or a non-polar solvent.

2. The process according to claim 1, wherein the one or more enzymes are selected from the group consisting of cellulase, hemicellulase, and pectinase.

3. The process according to claim 1, further comprising pretreating the powdered Stevia leaves with a metal salt in combination with the one or more enzymes.

4. The process according to claim 3, wherein the metal salt comprises at least one of NaCl, $CaCl_2$, or $FeCl_3$.

5. The process according to claim 1, wherein passing the aqueous Stevia extract through the UF membrane comprises passing the aqueous Stevia extract through a UF membrane having a pore size 0.01-005 μM and defined molecular weight cut off (MWCO) of 5-10-30kDa at a trans-membrane pressure of 200-800 kPa, and a temperature range from 30-550C.

6. The process according to claim 5, wherein the clarified Stevia permeate comprises about 80% color clarity and impurity removal.

7. The process according to claim 1, wherein passing the clarified Stevia permeate through the NF membrane comprises passing the clarified Stevia permeate through an NF membrane of MWCO of 150 -300 Da at a trans-membrane pressure of 1500-2500 kPa and a temperature in the range of 30- 45° C.

8. The process according to claim 1, wherein the basic material is at least one of calcium hydroxide, calcium carbonate, or potassium hydroxide, and the mineral acid comprises $FeCl_3$, HCl, or phosphoric acid.

* * * * *